(12) United States Patent
Barnes

(10) Patent No.: US 10,838,878 B2
(45) Date of Patent: *Nov. 17, 2020

(54) APPARATUS AND METHOD FOR GENERATING SIGNED BOUNDED POINTERS

(71) Applicant: ARM LIMITED, Cambridge (GB)

(72) Inventor: Graeme Peter Barnes, Cambridge (GB)

(73) Assignee: ARM Limited, Cambridge (GB)

( * ) Notice: Subject to any disclaimer, the term of this patent is extended or adjusted under 35 U.S.C. 154(b) by 151 days.

This patent is subject to a terminal disclaimer.

(21) Appl. No.: 16/070,801

(22) PCT Filed: Dec. 23, 2016

(86) PCT No.: PCT/GB2016/054060
§ 371 (c)(1),
(2) Date: Jul. 18, 2018

(87) PCT Pub. No.: WO2017/137714
PCT Pub. Date: Aug. 17, 2017

(65) Prior Publication Data
US 2019/0026236 A1     Jan. 24, 2019

(30) Foreign Application Priority Data
Feb. 12, 2016   (GB) .................. 1602544.7

(51) Int. Cl.
*G06F 12/14*   (2006.01)
*G06F 21/12*   (2013.01)
(Continued)

(52) U.S. Cl.
CPC ........ *G06F 12/1441* (2013.01); *G06F 9/3004* (2013.01); *G06F 21/125* (2013.01); *G06F 21/54* (2013.01); *G06F 21/64* (2013.01)

(58) Field of Classification Search
CPC .. G06F 12/14; G06F 12/1408; G06F 12/1416; G06F 2212/1052; G06F 21/577;
(Continued)

(56) References Cited

U.S. PATENT DOCUMENTS 5,845,331 A    12/1998 Carter et al.
6,826,672 B1 * 11/2004 Brown ................ G06F 12/1475
                                                        711/220
(Continued)

FOREIGN PATENT DOCUMENTS

GB         2 402 236      12/2004

OTHER PUBLICATIONS

International Search Report and Written Opinion of the ISA for PCT/GB2016/054060, dated Feb. 10, 2017, 13 pages.
(Continued)

*Primary Examiner* — David Yi
*Assistant Examiner* — Tahilba O Puche
(74) *Attorney, Agent, or Firm* — Nixon & Vanderhye P.C.

(57) ABSTRACT

An apparatus and method are provided for generating signed bounded pointers from general purpose specified data, for example data that may exist within a backing store such as a disk. The apparatus has processing circuitry that is responsive to a bounded pointer generation request to perform a generation operation to generate a bounded pointer from the specified data provided at least one generation condition is met. The bounded pointer comprises a pointer value and associated attributes, and the associated attributes include range information indicative of an allowable range of addresses when using the pointer value. The processing circuitry is further responsive to detection from the specified data that the bounded pointer to be generated is a signed bounded pointer incorporating a signature, to perform as part of the generation operation, at least in the presence of
(Continued)

a signing condition being met, an insert signature operation during which the signature is determined from a portion of the specified data and incorporated within the generated bounded pointer. Thereafter, the generated bounded pointer is output for storage in a storage element of the apparatus.

16 Claims, 22 Drawing Sheets

(51) Int. Cl.
  *G06F 21/54* (2013.01)
  *G06F 9/30* (2018.01)
  *G06F 21/64* (2013.01)
(58) Field of Classification Search
  CPC .. G06F 12/1441; G06F 9/3004; G06F 21/125; G06F 21/64
  See application file for complete search history.

(56) References Cited

U.S. PATENT DOCUMENTS

| | | | |
|---|---|---|---|
| 9,804,891 B1* | 10/2017 | Adalier | H04L 63/1416 |
| 2003/0142821 A1* | 7/2003 | Ross | H04L 9/0662 380/46 |
| 2004/0128535 A1 | 7/2004 | Cheng | |
| 2008/0060077 A1 | 3/2008 | Cowan et al. | |
| 2012/0246437 A1 | 9/2012 | Radovic et al. | |
| 2014/0173293 A1 | 6/2014 | Kaplan | |
| 2015/0294113 A1* | 10/2015 | Troeger | G06F 21/577 726/25 |

OTHER PUBLICATIONS

Combined Search and Examination Report for GB1602544.7, dated Jul. 15, 2016, 6 pages.
Szekeres et al., "SoK: Eternal War in Memory", Security and Privacy (SP), 2013 IEEE Symposium , May 19, 2013, pp. 48-62.
Mashtizadeh et al., "CCFI: Cryptographically Enforced Control Flow Integrity", Proceedings of the $22^{nd}$ ACM SIGSAC Conference on Computer and Communications Security, Oct. 12, 2015, pp. 941-951.
Cowan et al., "PointGuard™: Protecting Pointers from Buffer Overflow Vulnerabilities", USENIX, Jul. 29, 2003, 15 pages.
"WIN04-C Consider encrypting function pointers" , https://www.securecoding.cert.org/confluence/ display/c/WIN04-C.+Consider+encrypting+function+pointers , retrieved Jul. 7, 2016, 2 pages.
Watson et al, "Capability Hardware Enhanced RISC Instructions: CHERI Instruction-Set Architecture" ,Technical Report, No. 850, University of Cambridge Computer Laboratory, Apr. 2014, 131 pages.
U.S. Appl. No. 16/073,497, filed Jul. 27, 2018, Barnes et al.
International Search Report and Written Opinion of the ISA for PCT/GB2016/054054, dated Feb. 13, 2017, 12 pages.
Combined Search and Examination Report for GB 1602539.7, dated Jul. 15, 2016, 6 pages.

* cited by examiner

"SIGNING PERMITTED" DECISION IN FIGURE 18
(FIGS 19A TO 19C ILLUSTRATE THREE OPTIONS)

APPARATUS AND METHOD FOR GENERATING SIGNED BOUNDED POINTERS

This application is the U.S. national phase of International Application No. PCT/GB2016/054060 filed 23 Dec. 2016, which designated the U.S. and claims priority to GB Patent Application No. 1602544.7 filed 12 Feb. 2016, the entire contents of each of which are hereby incorporated by reference.

The present technique relates to the field of data processing.

Some data processing apparatuses may support bounded pointers where a pointer indicating a particular address is associated with range information indicating an allowable range of addresses for the pointer. For example, such pointers may be referred to as "fat pointers".

In addition to range information, such bounded pointers may also have other associated attributes, defining one or more restrictions/permissions on the use of the pointer. Use of such bounded pointers can hence provide strong security, by placing constraints on how the pointer value specified by the bounded pointer is used.

Whilst techniques have been developed which enable bounded pointers to be distinguished from general purpose data within both registers and memory, it is sometimes the case that such bounded pointers need to be output to a backing store such as a disk, and in that case the bounded pointer may be decomposed into a format where it is treated merely as general purpose data within the backing store. Subsequently, it may be necessary to seek to recreate such bounded pointers from the general purpose data in the backing store, but any techniques provided for reconstructing such capabilities from general purpose data need to be carefully controlled, as otherwise the security benefits residing from the use of such bounded pointers could be compromised.

In one example configuration, there is provided an apparatus, comprising: processing circuitry responsive to a bounded pointer generation request to perform a generation operation to generate a bounded pointer from specified data provided at least one generation condition is met, the bounded pointer comprising a pointer value and associated attributes, the associated attributes including range information indicative of an allowable range of addresses when using said pointer value; the processing circuitry being responsive to detection from the specified data that the bounded pointer to be generated is a signed bounded pointer incorporating a signature, to perform as part of the generation operation, at least when a signing condition is met, an insert signature operation during which the signature is determined from a portion of the specified data and incorporated within the generated bounded pointer; and storage to store the bounded pointer generated by the processing circuitry.

In another example configuration there is provided a method of generating signed bounded pointers, comprising: performing, in response to a bounded pointer generation request, a generation operation to generate a bounded pointer from specified data provided at least one generation condition is met, the bounded pointer comprising a pointer value and associated attributes, the associated attributes including range information indicative of an allowable range of addresses when using said pointer value; performing as part of the generation operation, in response to detection from the specified data that the bounded pointer to be generated is a signed bounded pointer incorporating a signature, and at least when a signing condition is met, an insert signature operation during which the signature is determined from a portion of the specified data and incorporated within the generated bounded pointer; and outputting for storing in a storage location the generated bounded pointer.

In a yet further example configuration there is provided an apparatus, comprising: processing means for performing a generation operation, in response to a bounded pointer generation request, to generate a bounded pointer from specified data provided at least one generation condition is met, the bounded pointer comprising a pointer value and associated attributes, the associated attributes including range information indicative of an allowable range of addresses when using said pointer value; the processing means further for performing as part of the generation operation, in response to detection from the specified data that the bounded pointer to be generated is a signed bounded pointer incorporating a signature, and at least when a signing condition is met, an insert signature operation during which the signature is determined from a portion of the specified data and incorporated within the generated bounded pointer; and storage means for storing the bounded pointer generated by the processing means.

The present technique will be described further, by way of example only, with reference to embodiments thereof as illustrated in the accompanying drawings, in which.

Figure 4:
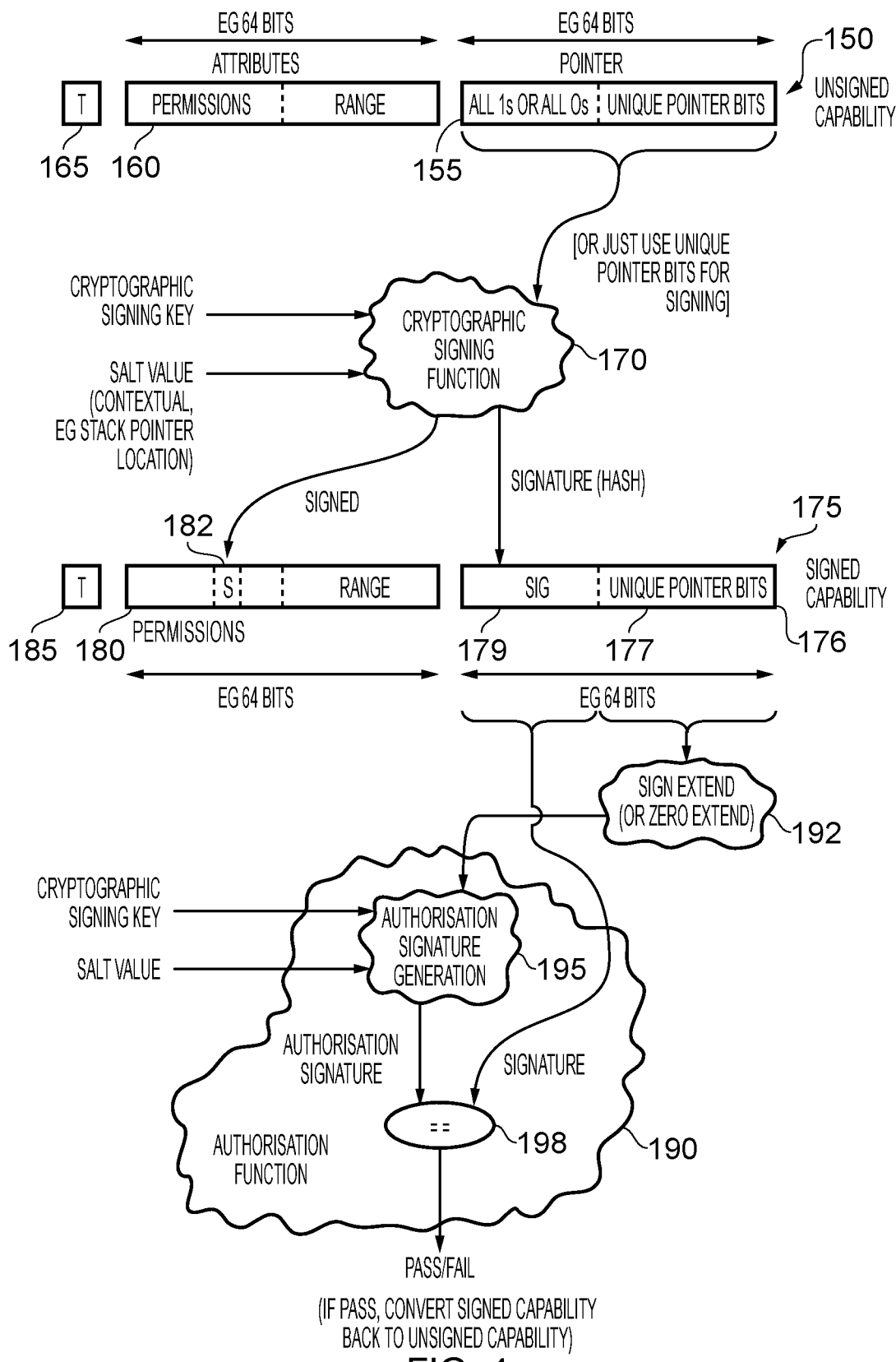
Figure 5:
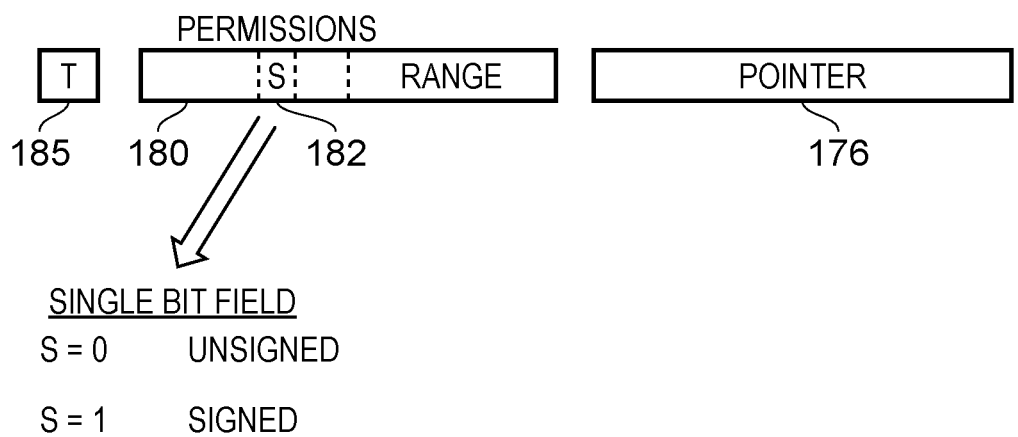
Figure 6:
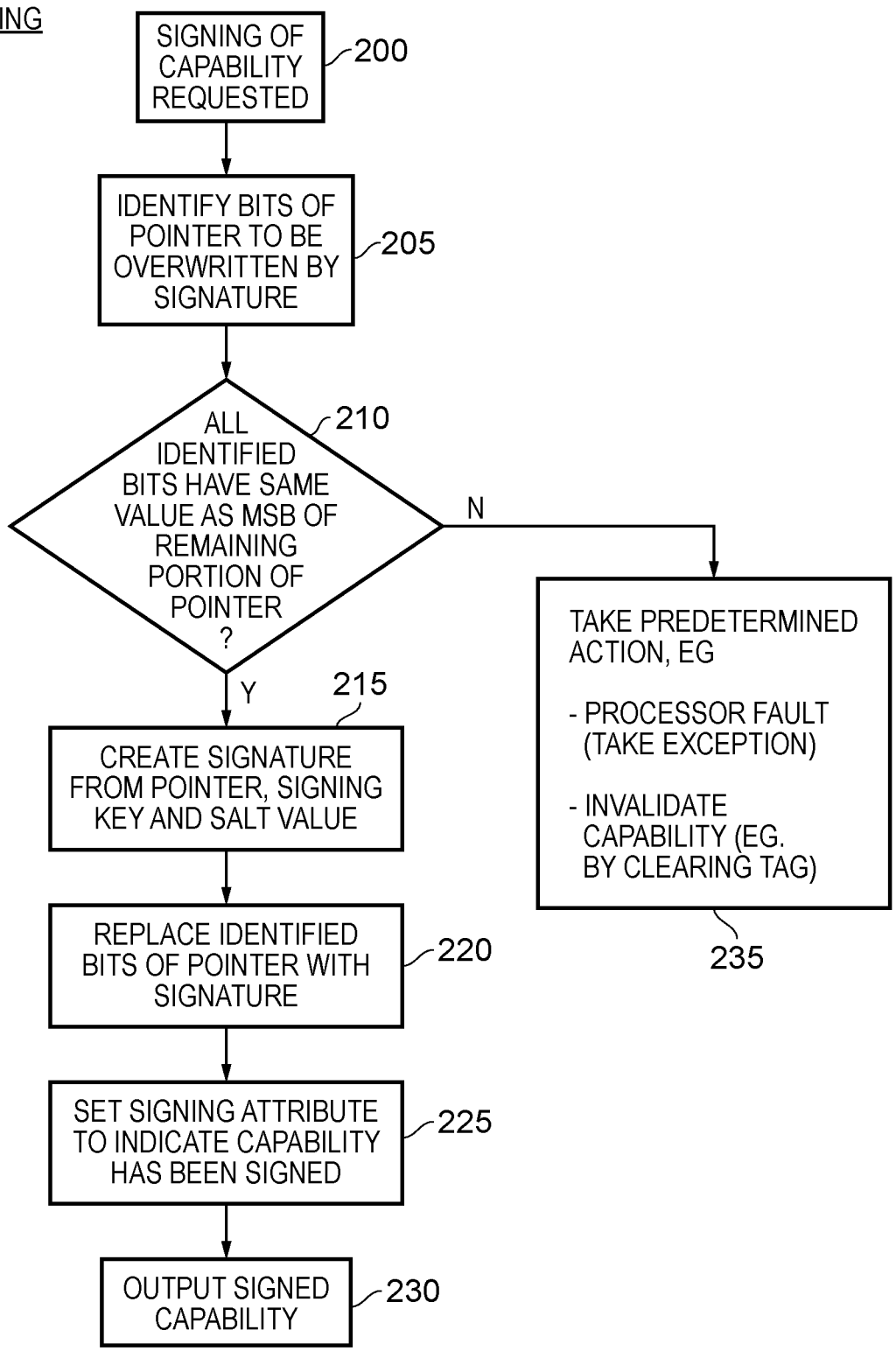
Figure 7:
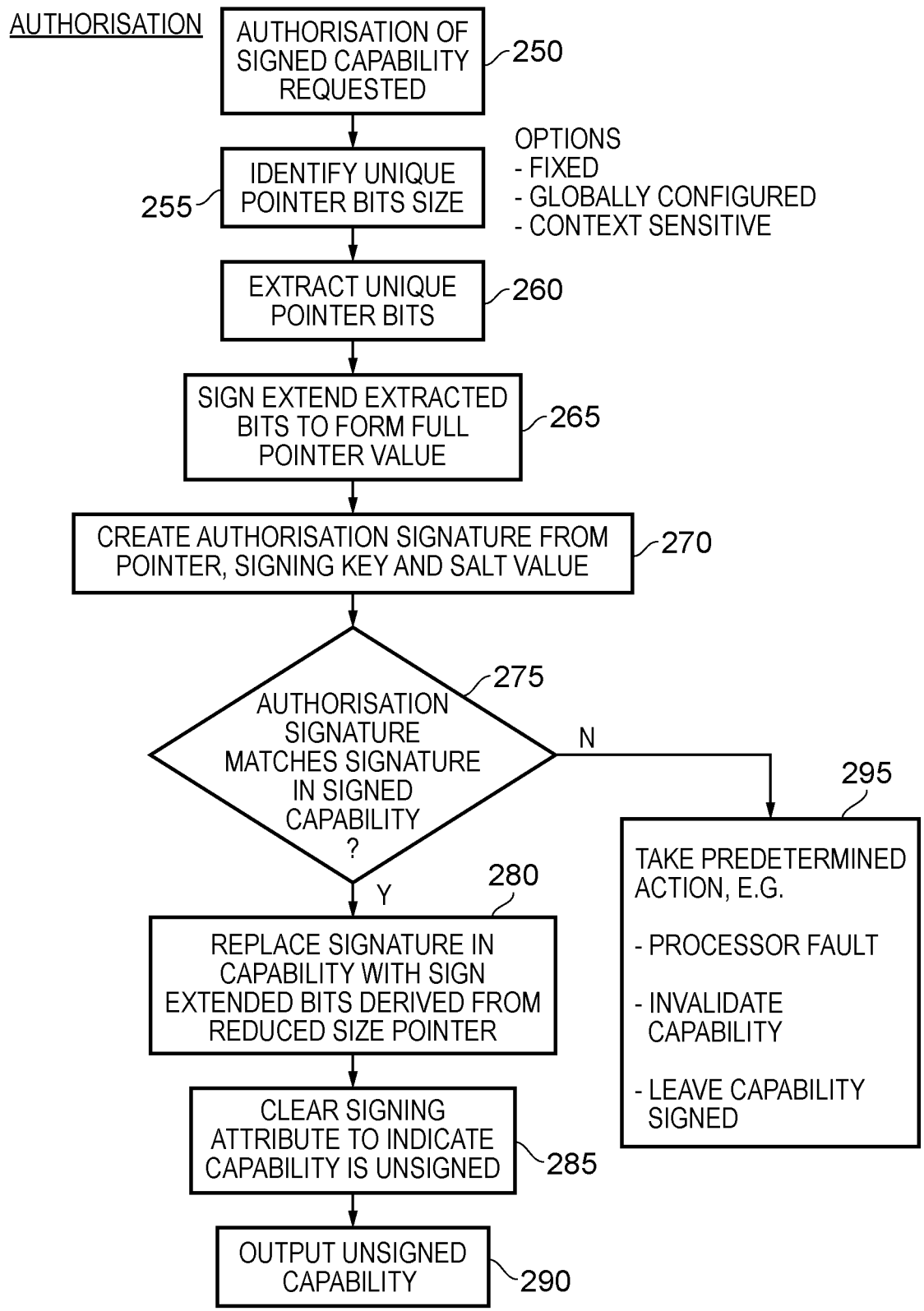
Figure 8:
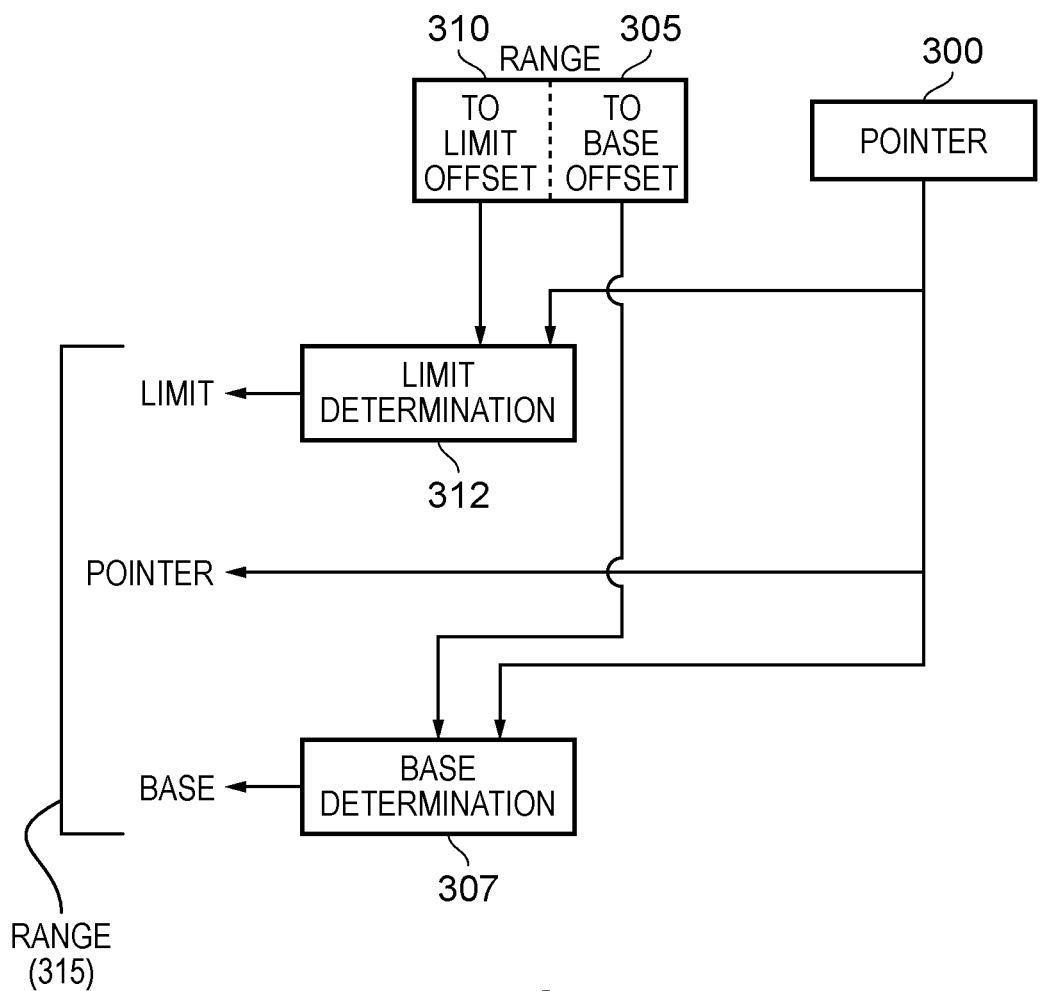
Figure 9:
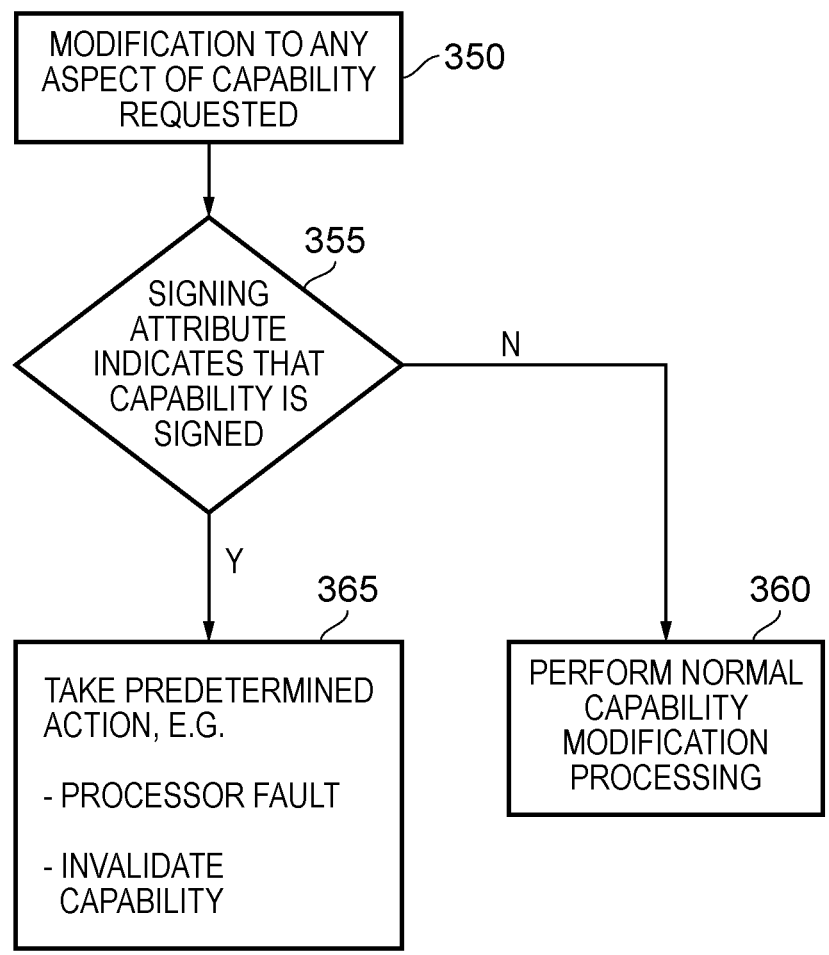
Figure 10:
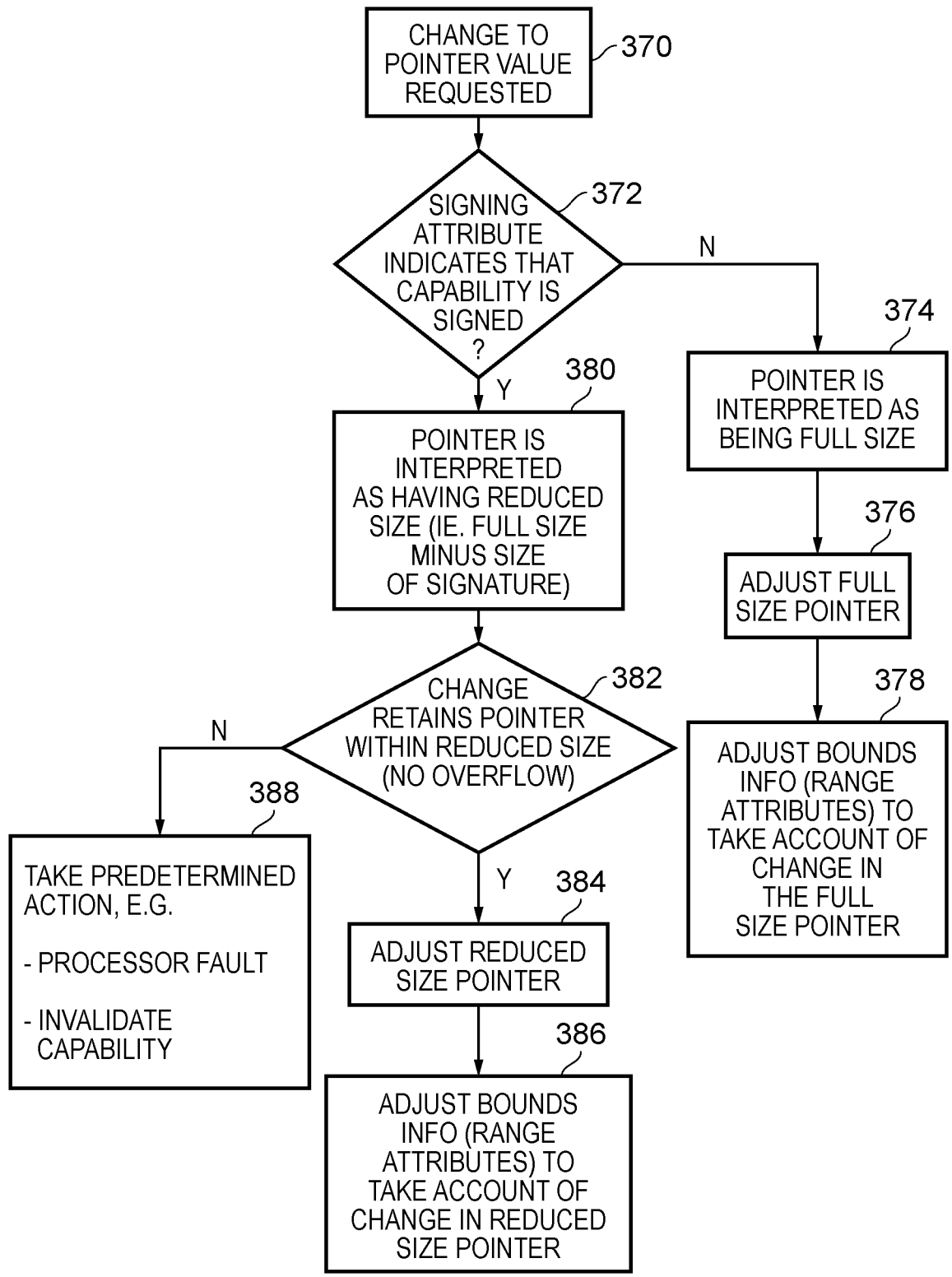
Figure 11:
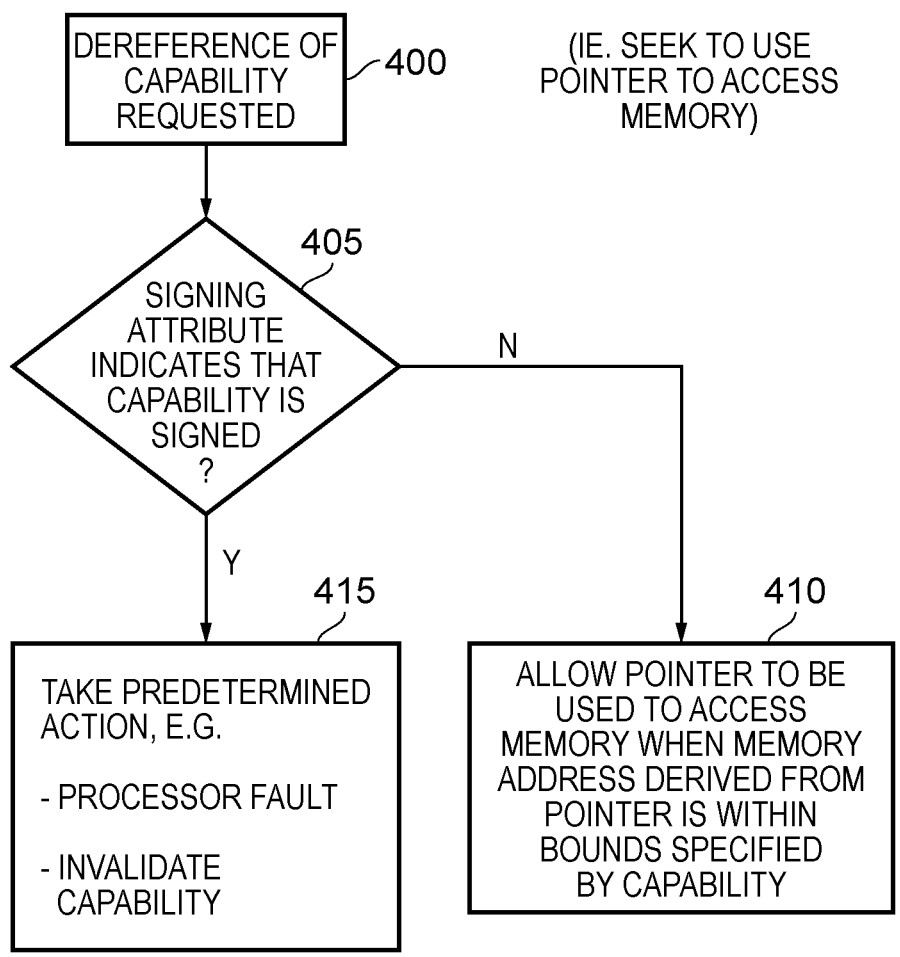
Figure 12:
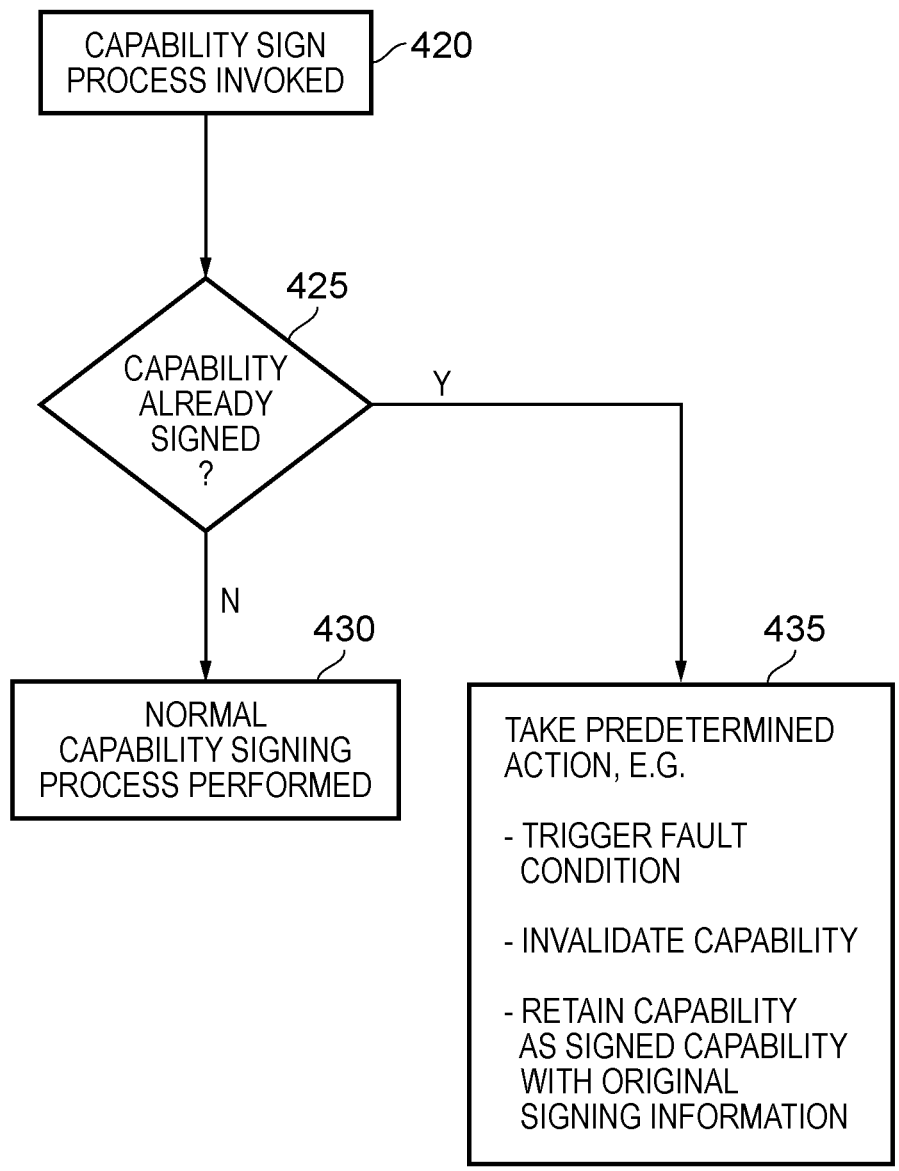
Figure 13:
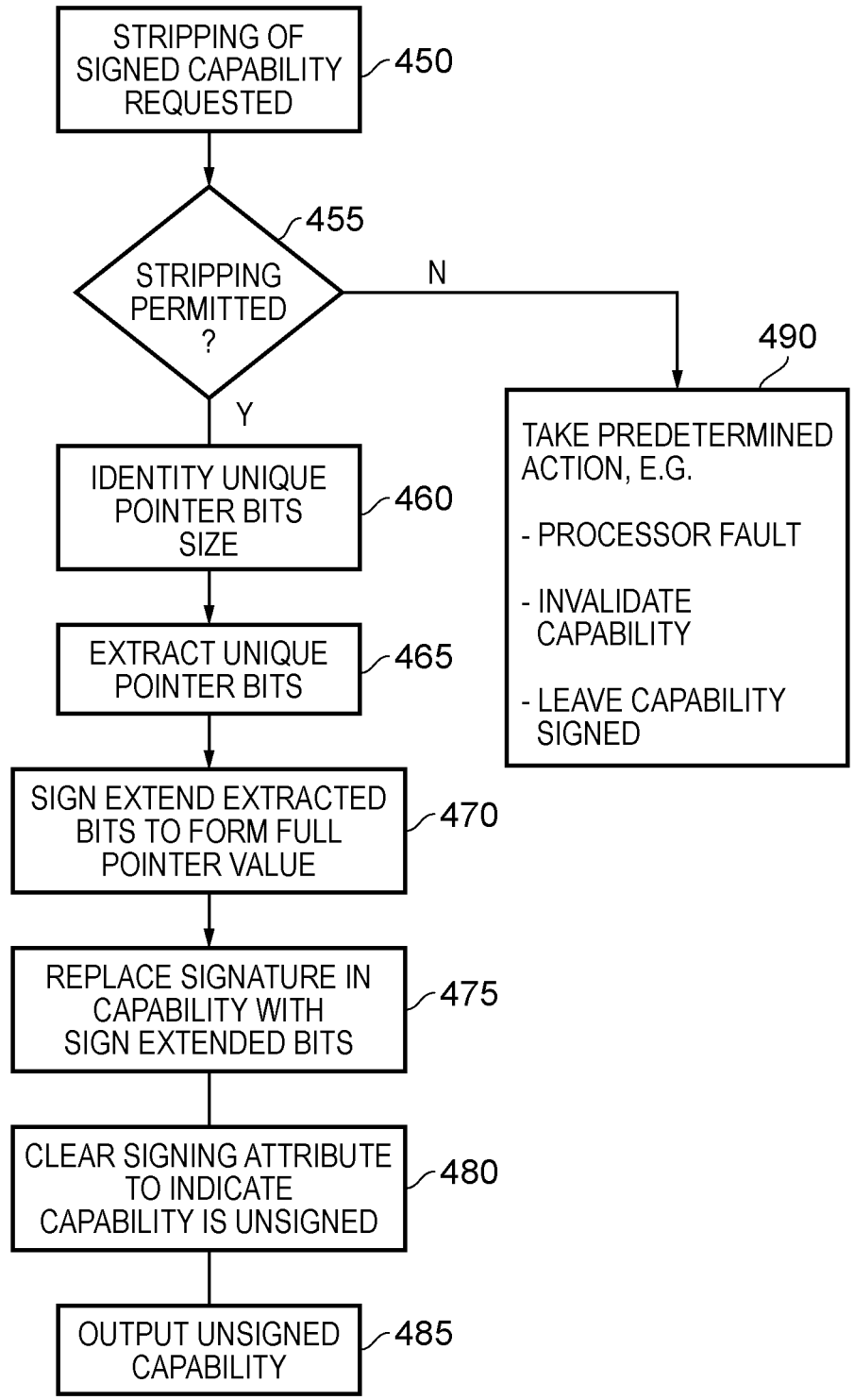
Figure 14A:
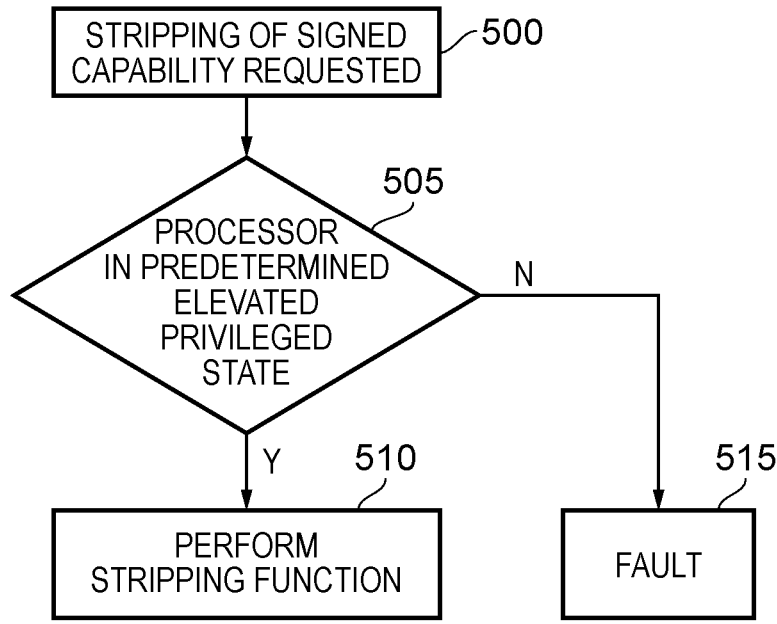
Figure 14B:
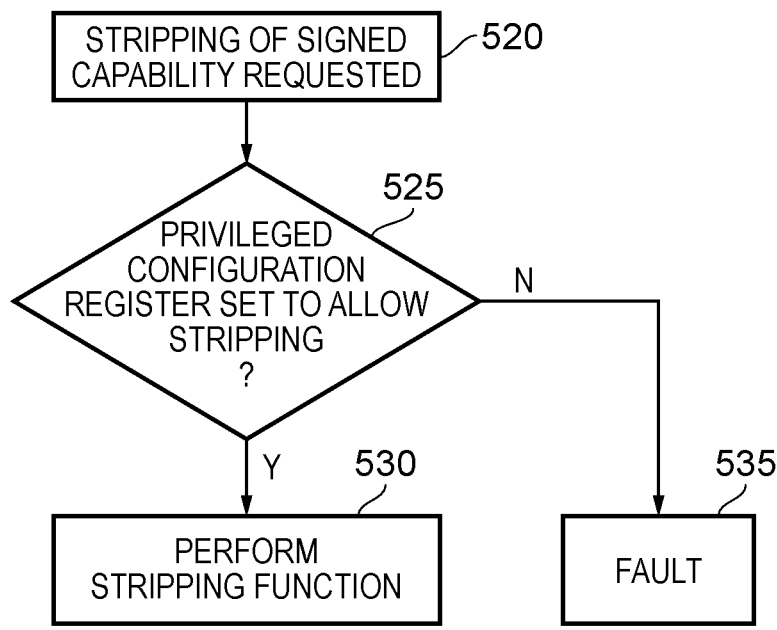
Figure 14C:
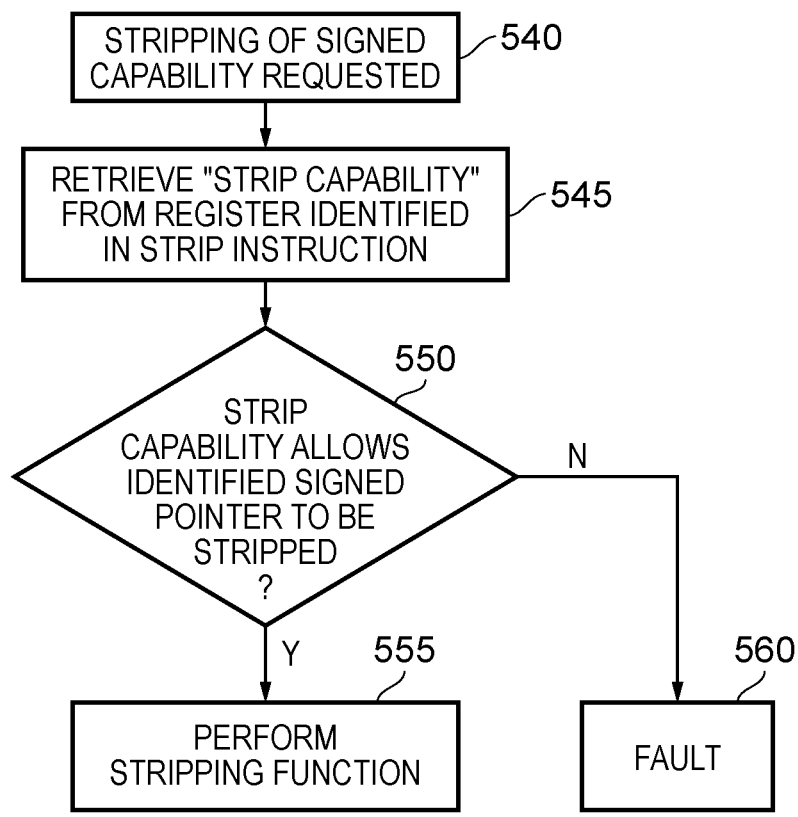
Figure 15:
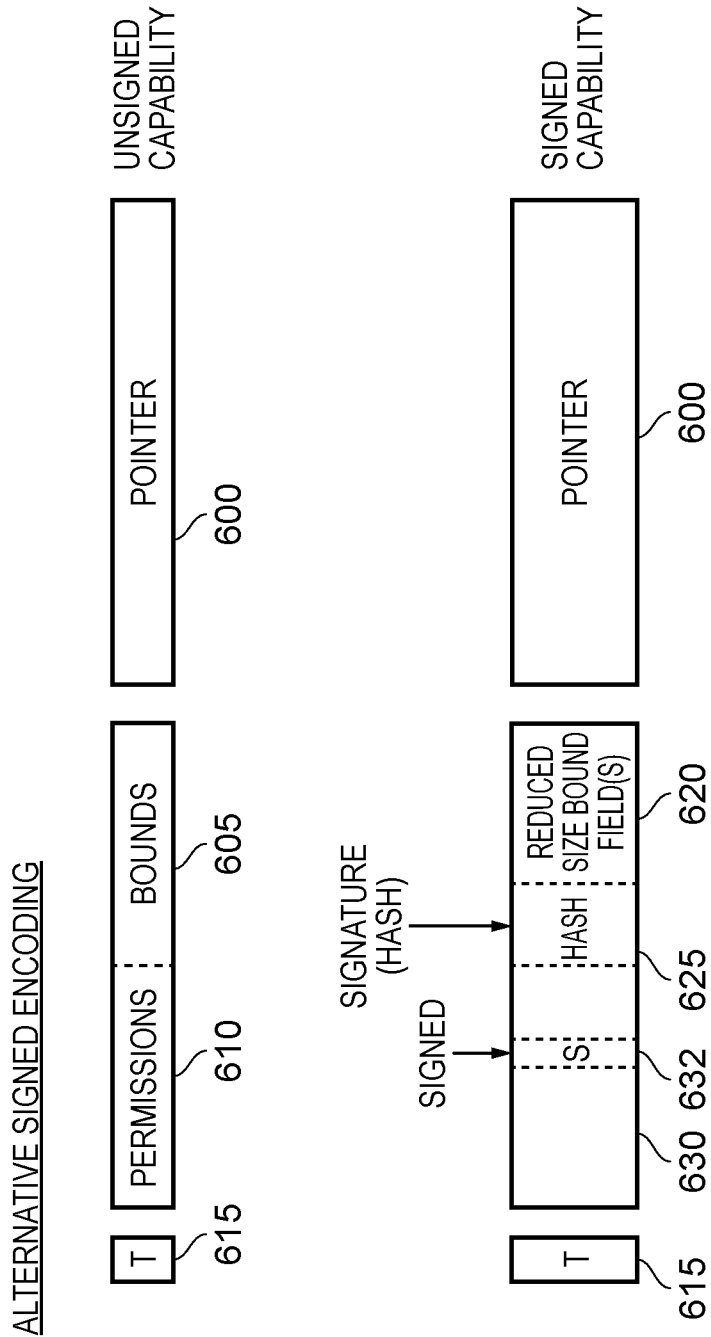
Figure 16A:
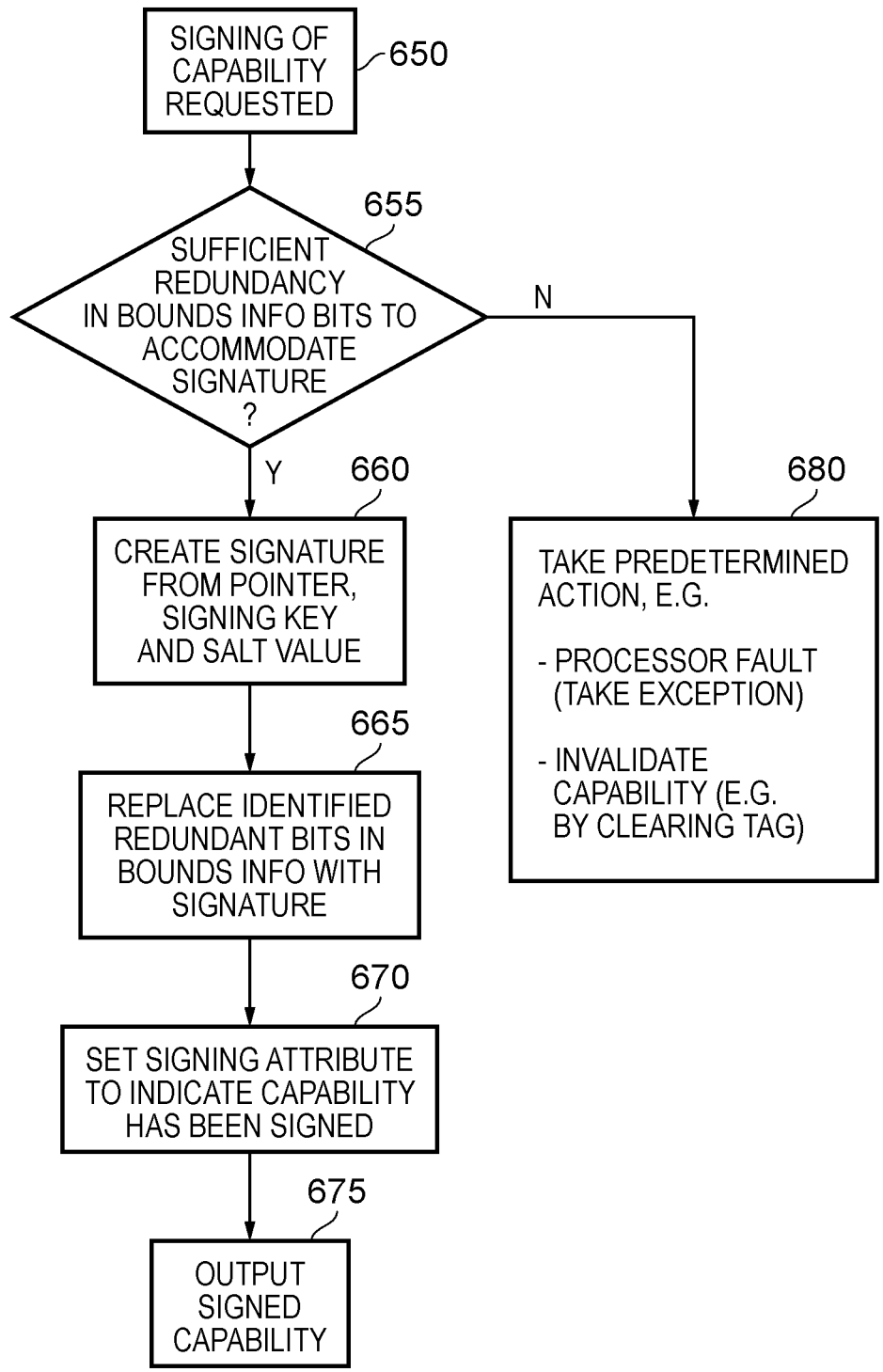
Figure 16B:
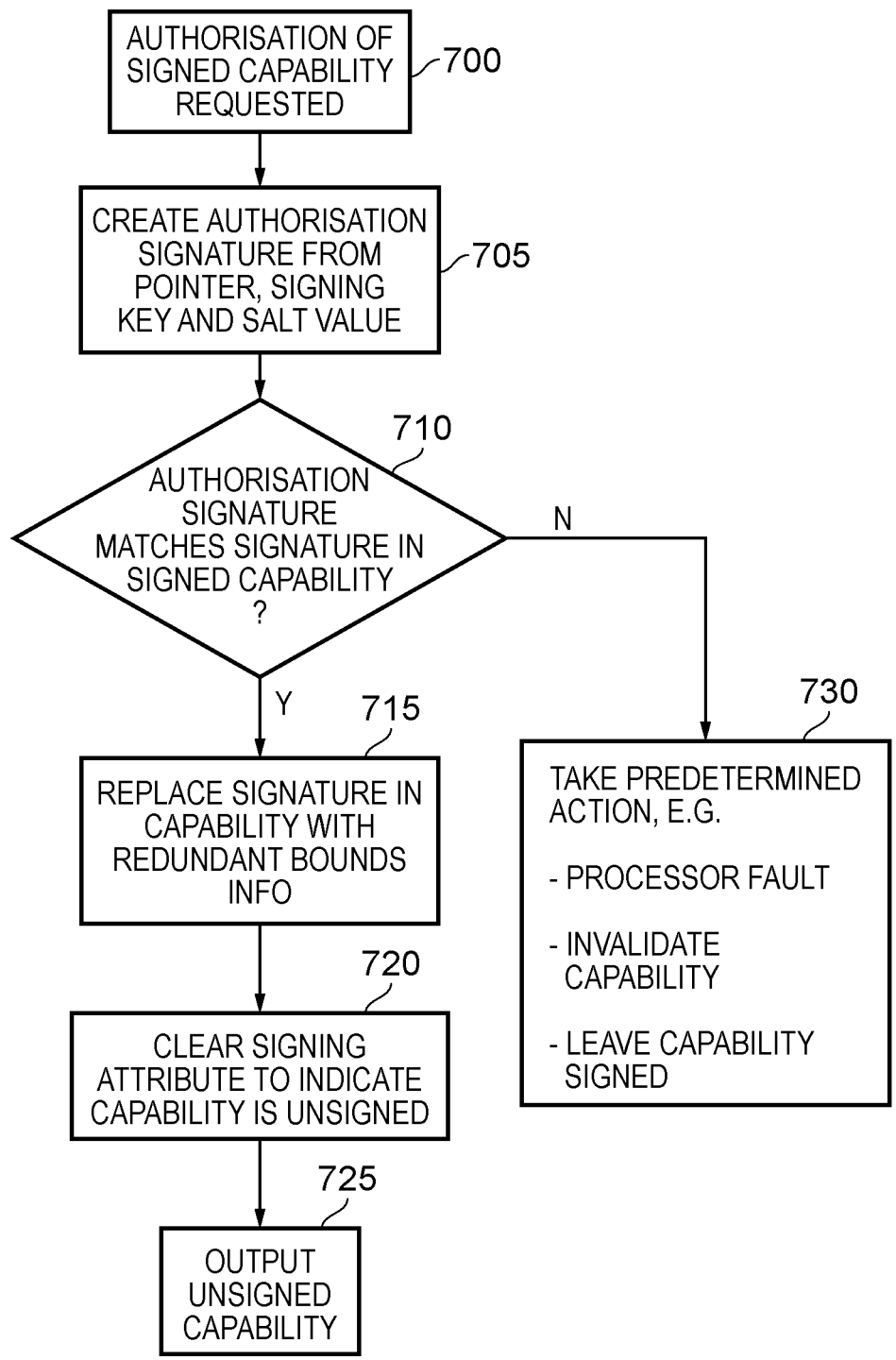
Figure 17:
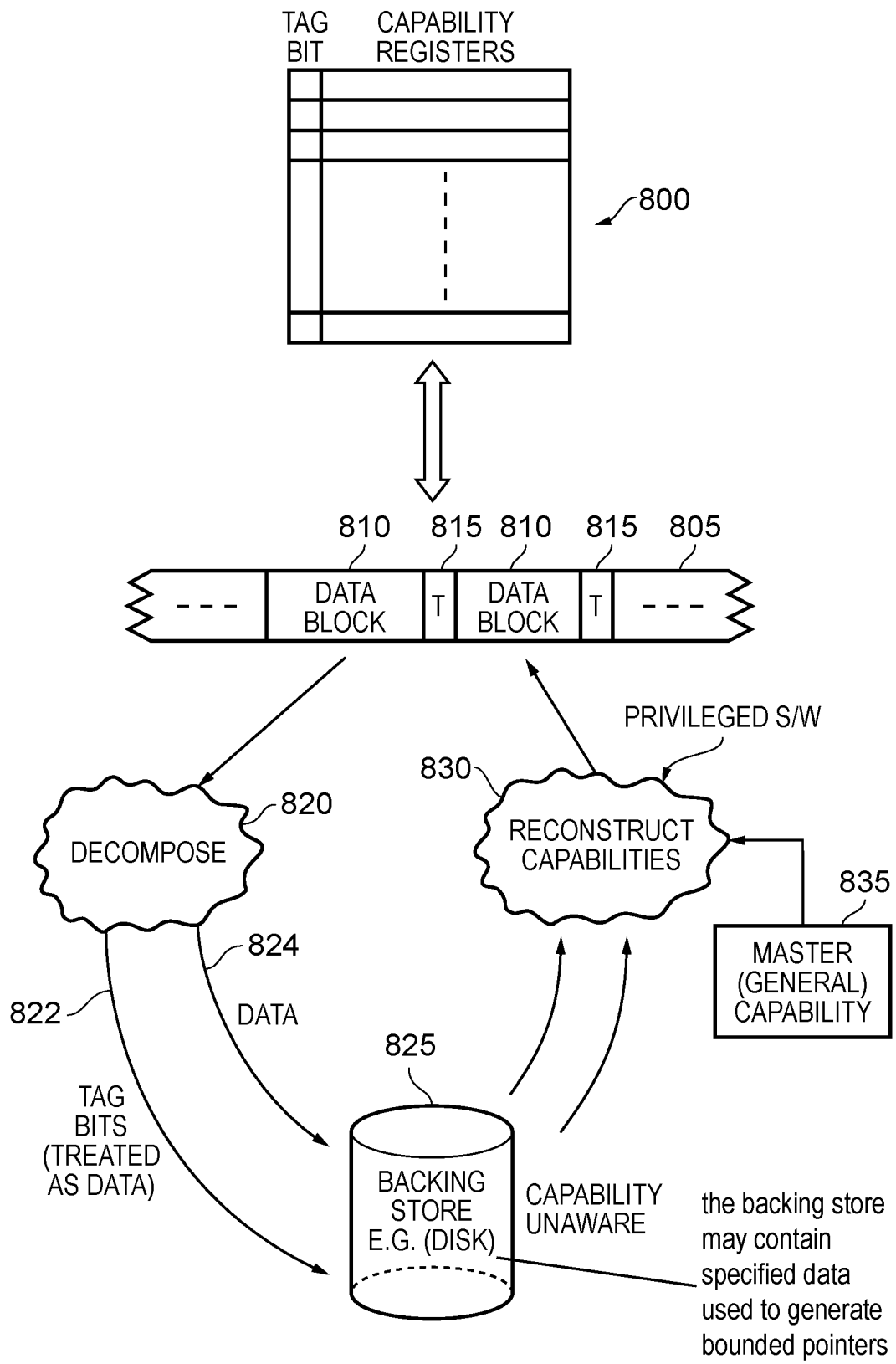
Figure 18:
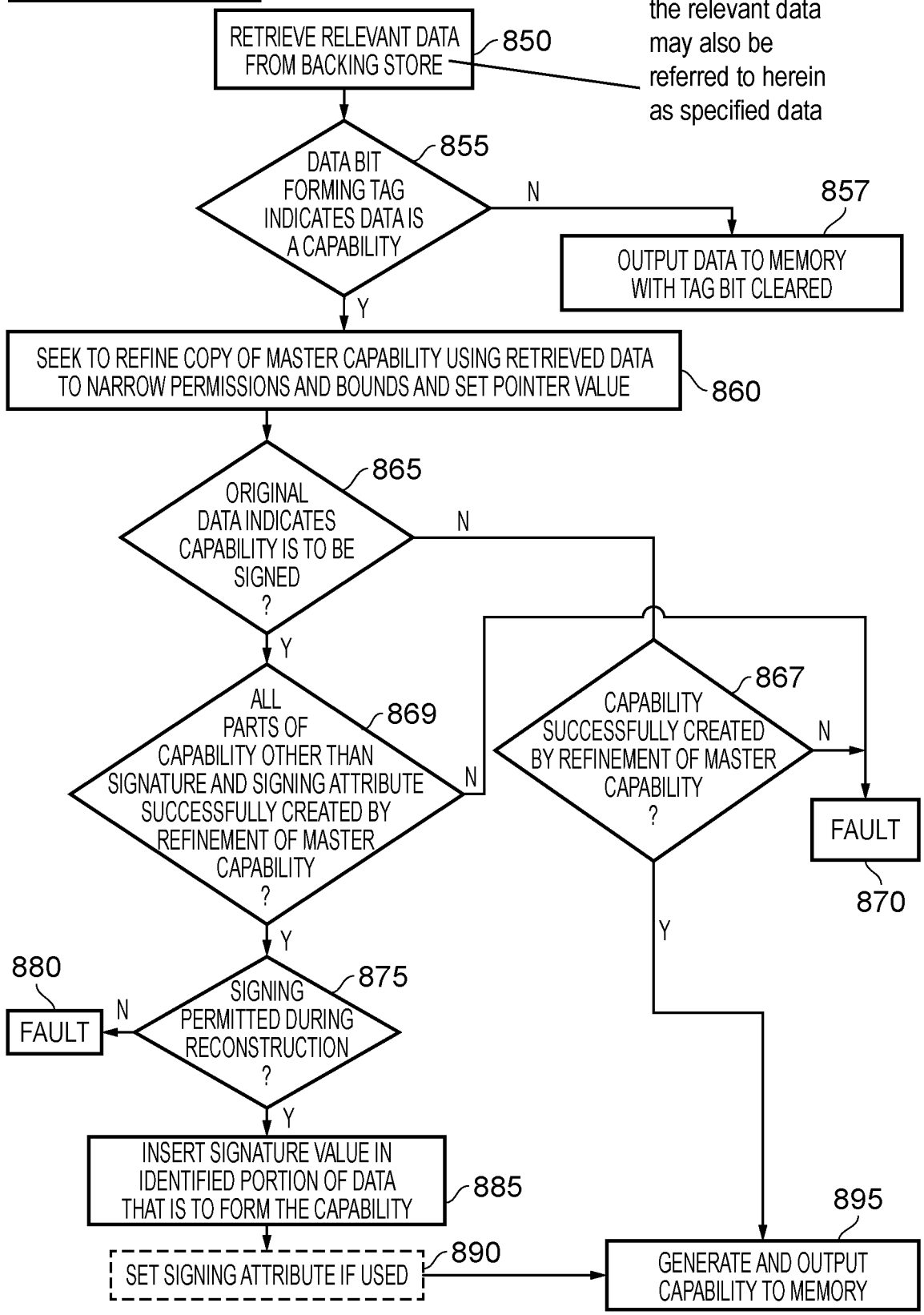
Figure 19A:
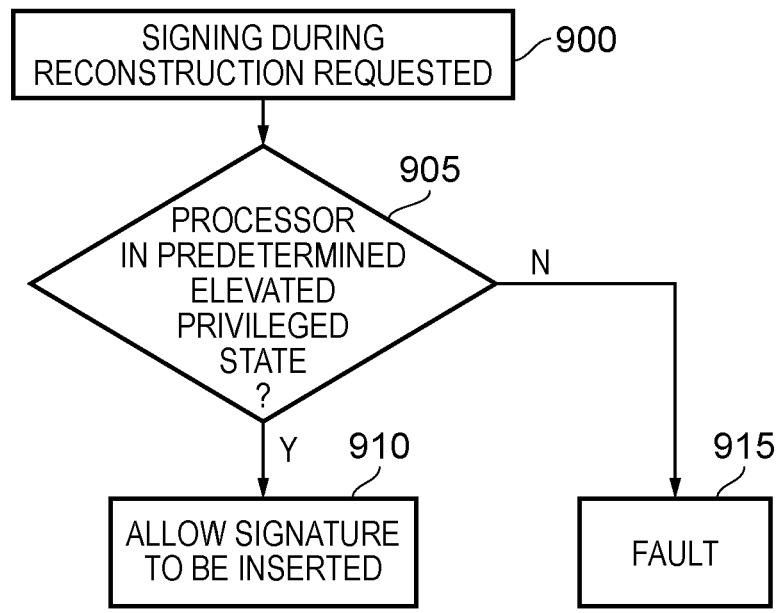
Figure 19B:
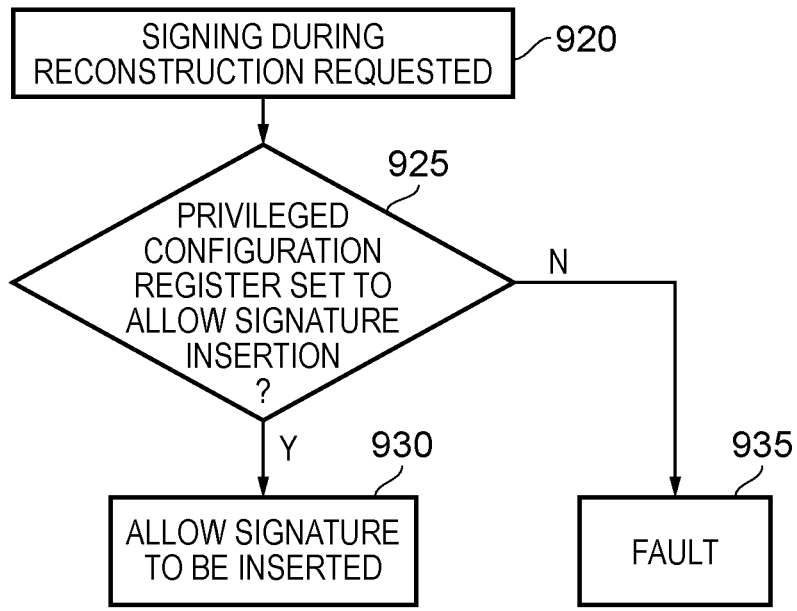
Figure 19C:
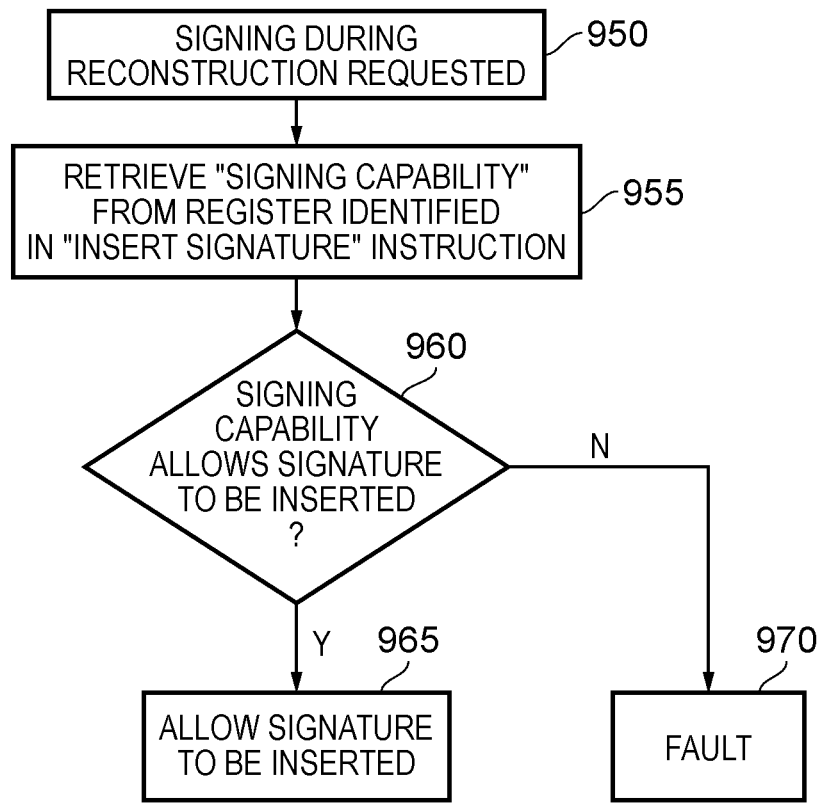

FIG. 4 schematically illustrates a signing operation and a subsequent authorisation operation in accordance with one embodiment;

FIG. 5 illustrates the use of signing information within the associated attributes of a bounded pointer in accordance with one embodiment;

FIG. 6 is a flow diagram illustrating a signing operation in accordance with one embodiment;

FIG. 7 is a flow diagram illustrating an authorisation operation in accordance with one embodiment;

FIG. 8 illustrates an example arrangement where the range information of a bounded pointer is stored relative to the pointer value of that bounded pointer;

FIG. 9 is a flow diagram illustrating an operation performed to ensure the immutability of a signed capability (also referred to as a signed bounded pointer) in accordance with one embodiment;

FIG. 10 is a flow diagram illustrating a sequence of operations that may be performed when modifications to the pointer value of a signed capability are permitted, in accordance with one embodiment;

FIG. 11 is a flow diagram illustrating a dereferencing operation performed in accordance with one embodiment;

FIG. 12 is a flow diagram illustrating how a capability signing operation may be limited to situations where the input capability is not yet already signed, in accordance with one embodiment;

FIG. 13 is a flow diagram illustrating a stripping operation performed in accordance with one embodiment;

FIGS. 14A to 14C illustrate various example checks that may be performed in some embodiments in order to determine whether stripping is permitted;

FIG. 15 illustrates an alternative signed capability encoding in accordance with one embodiment;

FIGS. 16A and 16B are flow diagrams illustrating a signing operation and an authorisation operation, respectively, in embodiments where the signature is added to the bound information in accordance with the approach of FIG. 15;

FIG. 17 is a diagram schematically illustrating a reconstruction process that may be used to reconstruct capabilities from data held in a backing store, in accordance with one embodiment;

FIG. 18 is a flow diagram illustrating the capability reconstruction process that may be performed in accordance with one embodiment; and FIGS. 19A to 19C illustrate various checks that may be performed in some embodiments in order to determine whether signing is permitting during such a capability reconstruction process.

Before discussing the embodiments with reference to the accompanying figures, the following description of embodiments is provided.

Some processing apparatuses may support the use of bounded pointers. The pointer itself may point to, or be used to determine, the address of a data value to be accessed or an instruction to be executed, for example. However the pointer may also have associated range information which indicates an allowable range of addresses when using the pointer. This can be useful for example for ensuring that the address determined from the pointer remains within certain bounds to maintain security or functional correctness of behaviour. For example, there is increasing interest in capability-based architectures in which certain capabilities are defined for a given process, and an error can be triggered if there is an attempt to carry out operations outside the defined capabilities. The range information for a bounded pointer may be part of the capability information defined for such an architecture, and within a capability-based architecture such a bounded pointer (including its associated capability information) may be referred to as a capability.

Hence, an apparatus may have bounded pointer storage elements used to store a pointer having associated range information indicative of an allowable range of addresses when using the pointer. Each bounded pointer storage element could be a register, or a memory location in general purpose memory, for example a location on a stack memory.

Certain instructions can be used to reference such a bounded pointer storage element in order to obtain a pointer which is then used to derive an address in memory required during operation of the instruction. The pointer may be used directly to identify the memory address, or may be used to derive the memory address, for example by the addition of an offset to the pointer value.

One issue facing software is control flow integrity (CFI). In particular, attempts may be made to subvert the intended flow of control through a computer program, for instance by seeking to modify the intended branching behaviour so as to effectively stitch together portions of the program code in a way other than that intended. For example, if one task can overwrite a return address to be used by another task, then this can cause that other task to subsequently branch to an area of code that was not intended. Certain properties of bounded pointers such as those used in the above-mentioned capability-based architectures can mitigate to a degree the CFI problem. For example, the associated range information can limit the range of addresses that may be targeted by a branch instruction when deriving the target address from the pointer stored in a bounded pointer storage element. In capability-based architectures, it is also known to provide mechanisms that prevent generic data being used as a capability to derive branch target addresses, and further the locations in which certain capabilities can be maintained may be restricted. However, within these limitations, it is still possible for a rogue process to manipulate bounded pointers in a manner that can give rise to the intended flow of control through a computer program being subverted, for example by enabling control to be transferred to an unexpected program address.

With the aim of further improving the security of bounded pointers, it is contemplated providing a signing process to enable bounded pointers to be signed, along with a corresponding authorisation process to allow signed bounded pointers to be converted back into an unsigned form. During the signing process, a signature may be inserted into the bounded pointer, and during the authorisation process an authorisation signature is created which is then compared with that signature in order to determine if there is a match. If there is a match, then the authorisation process can proceed to unsign the bounded pointer in order to create the unsigned form of the bounded pointer, which can then be used for subsequent operations.

When allowing the use of signed bounded pointers in addition to unsigned bounded pointers, this can give rise to additional complications when such bounded pointers are decomposed and stored as general purpose data within a backing store, and it is then required to reconstruct the bounded pointers from that general purpose data. The techniques described herein aim to provide an efficient and secure mechanism for enabling not only unsigned bounded pointers, but also signed bounded pointers, to be recreated from general purpose data in a backing store.

In one embodiment, an apparatus is provided that has processing circuitry that is responsive to a bounded pointer generation request to perform a generation operation to generate a bounded pointer from specified data provided at least one generation condition is met. The specified data may take a variety of forms, but for example may be data contained in a backing store such as a disk. The bounded pointer that needs to be generated will comprise a pointer value and associated attributes, with the associated attributes including range information indicative of an allowable range of addresses when using the pointer value.

The processing circuitry is responsive to detection from the specified data that the bounded pointer to be generated is a signed bounded pointer incorporating a signature, to perform as part of the generation operation, at least when a signing condition is met, an insert signature operation during which the signature is determined from a portion of the specified data and incorporated within the generated bounded pointer. The generated bounded pointer is then output for storage in a suitable storage element, for example a register or a storage location within memory.

The at least one generation condition can be chosen with the aim of ensuring that the processing circuitry is only able to create, from the specified data, bounded pointers whose associated attributes identify rights that the processing circuitry is allowed to hold. This ensures that the processing circuitry cannot just arbitrarily create bounded pointers from general purpose data in the backing store. The generation condition can be specified in a variety of ways. In one embodiment, if the generation condition is met, then the processing circuitry will be allowed to perform the insert signature operation. However, in an alternative embodiment, an additional signing condition may be specified, which needs to be met before the processing circuitry is allowed to perform an insert signature operation. Hence, this can further constrain the situations in which the processing circuitry is allowed to use general purpose data to form a signature that is added into a bounded pointer to form a signed bounded pointer.

Through use of the above approach, the processing circuitry can be arranged to reconstruct bounded pointers from specified data, but the rights to do so can be suitably constrained. Further, it is possible to also support the reconstruction of signed bounded pointers from specified data through an appropriate control of an insert signature operation.

In one embodiment, a signed bounded pointer also includes signing information within the associated attributes. In such embodiments, the processing circuitry may be further arranged, on performing the insert signature operation, to set the signing information within the associated attributes of the generated bounded pointer to identify that the bounded pointer has been signed. By including within the associated attributes such signing information, the apparatus is readily able to distinguish between signed bounded pointers and unsigned bounded pointers, and this can enable certain operations to be constrained to only be performed on unsigned bounded pointers, or at least to implement different functionality when processing a signed bounded pointer instead of an unsigned bounded pointer.

In one embodiment the processing circuitry is arranged to perform the insert signature operation as part of the generation operation only if said signing condition is met. The processing circuitry is then arranged, in response to determining that the signing condition is not met, to prevent generation of the bounded pointer. Hence, in such an embodiment, if the signing condition is not met, the request to generate a bounded pointer fails. There are a number of ways in which the processing circuitry may prevent generation of the bounded pointer. It could for example raise a processor fault when it is determined that the signing condition is not met, which may for example cause an exception to be taken, or could just output the retrieved data as general purpose data rather than marking it as a bounded pointer.

In an alternative embodiment, the processing circuitry may be arranged, in the absence of the signing condition being met, to generate the bounded pointer as an unsigned pointer. This may be appropriate for example where it is expected that, by generating the bounded pointer as an unsigned bounded pointer, this will cause a later fault when the processing circuitry seeks to use the bounded pointer, since at that point it will be expecting a signed bounded pointer, and instead the bounded pointer will be unsigned. However, in security sensitive applications, it may be considered more appropriate to prevent any bounded pointer being generated if the signing condition is not met.

There are a number of ways in which it can be determined whether the signing condition is met. For example, in one embodiment, the signing condition may be considered to be met when the processing circuitry is operating in at least one predetermined privileged state. Accordingly, the use of the insert signature operation can be restricted to certain privileged code executing on the processing circuitry.

In an alternative embodiment, a configuration storage element may be provided that is writeable to by the processing circuitry when operating in at least one predetermined privileged state, and the signing condition may be considered to be met when the configuration storage element identifies that performance of the insert signature operation is permitted. Hence, the use of the insert signature operation is still effectively controlled by the predetermined privileged state, but can be used when the processing circuitry is in other states provided that the configuration storage element allows it.

In a yet further alternative embodiment, a capability storage element may be provided for storing a signing capability. For example, the insert signature operation may be initiated by an insert signature request in the form of an insert signature instruction that identifies the signing capability as one of the input operands, another operand identifying the general purpose data that is to be used to form the signature. In such an embodiment, the processing circuitry is arranged to obtain the signing capability from the capability storage element as an operand for the insert signature operation, and the signing condition is determined to be met when the signing capability identifies that performance of the insert signature operation is permitted.

Whilst the above three identified options may be used in three different embodiments, in one embodiment multiple of these options may be used in combination, such that the signing condition is determined to be met if any one or more of those options is satisfied.

There are a number of ways in which the at least one generation condition may be specified. In one embodiment, the processing circuitry is arranged to have access to a general capability during performance of the generation operation, the general capability providing information sufficient to enable any allowed bounded pointer to be derived from the general capability. The processing circuitry is arranged to perform a refinement process on the general capability with reference to the specified data, and the at least one generation condition is met when the refinement process results in generation of an allowed bounded pointer that is consistent with the specified data.

Through the use of such a refinement process, it is possible to ensure that the specified data can only be used to generate a bounded pointer that is allowed having regard to the rights conveyed by the general capability. In particular, if it is not possible through the refinement process to produce an allowed bounded pointer that is consistent with the specified data, then a failure condition is detected, and the process may then prevent generation of the bounded pointer.

The refinement process can take a variety of forms, but in one embodiment, during the refinement process the processing circuitry seeks to narrow the range information and one or more permissions identified within the general capability, so as to match the values of corresponding portions of the specified data. Further, in one embodiment, during the refinement process the processing circuitry further seeks to set the pointer value to a value allowed by the general capability and that matches the value of a corresponding portion of the specified data. Hence, it can be seen that the refinement process serves to seek to amend the general capability into a form where it matches the specified data, but during this process it is not possible to exceed any of the rights given by the general capability, the general capability in effect providing a super-set of all of the possible rights that may be provided by a bounded pointer that is considered to be an allowed bounded pointer.

When the bounded pointer that is to be generated is an unsigned bounded pointer, then the refinement process can seek to obtain an exact match within the specified data and the refined version of the general capability, and in that event will determine that the bounded pointer is allowed, and hence will allow the bounded pointer to be output as a bounded pointer for storage in memory. However, when the specified data indicates that the bounded pointer to be generated is to be a signed bounded pointer, then it will not be possible to recreate the signing specific information of the signed bounded pointer from the general capability. Instead, it will be necessary to use the insert signature operation (in some embodiments constrained by the signing condition) to enable the necessary signing information to be added to the bounded pointer as it is created.

In one such embodiment, the at least one generation condition is considered to be met when the refinement process results in an allowed bounded pointer that matches those portions of the specified data other than any portion containing signing specific information. That signing specific information can then be added using the insert signature operation provided that operation is permitted having regard to any specified signing condition.

The signing specific information can take a variety of forms, but in one embodiment the portion of the specified data containing signing specific information is that portion from which the signature is determined. In embodiments where signing information is also included within the associated attributes of the generated bounded pointer, then the portion of the specified data containing signing specific information further includes a data field providing that signing information that is to be inserted within the attributes of the generated bounded pointer to identify that the bounded pointer has been signed.

Hence, by the above process, if it is determined that signing is permitted during reconstruction, then the signature is identified to correspond to a sequence of the bits within the specified data (e.g. data retrieved from a backing store) and is inserted in an identified portion of the data that is to form the generated capability.

The capability may be generated in a variety of ways, and how the signature is incorporated within the generated capability during the insert signature operation will vary accordingly. In one embodiment the capability is generated from the refined version of the general capability, and hence the signature is incorporated within that refined version of the general capability. Alternatively the capability may be generated from the specified data (e.g. a copy of the data retrieved from a backing store), and in that instance the incorporation of the signature effectively involves allowing that part of the specified data to deviate from the refined copy of the general capability.

The portion of the bounded pointer that is used to accommodate the signature can vary dependent on embodiment. In one embodiment, the processing circuitry is arranged to incorporate the signature within the generated bounded pointer within a plurality of specified bits whose content within an unsigned version of the bounded pointer is reproducible from other bits of the bounded pointer. Hence, the signature is incorporated within a portion of the bounded pointer that effectively contains redundant information, and hence there is no loss of information resulting from the incorporation of the signature. In particular, when the signature is subsequently removed in order to create an unsigned version, then the bits of the unsigned bounded pointer that were overwritten by the signature can be recreated from the remaining bits of the bounded pointer.

In one embodiment, the plurality of specified bits are used to contain a portion of the pointer value within the unsigned version of the bounded pointer, and that portion of the pointer value is derivable from a remaining portion of the pointer value. However, in an alternative embodiment, the plurality of specified bits are used to contain a portion of the range information within the unsigned version of the bounded pointer, and a range specified by the range information is representable within a remaining portion of the range information.

Particular embodiments will now be described with reference to the Figures.

Figure 1:
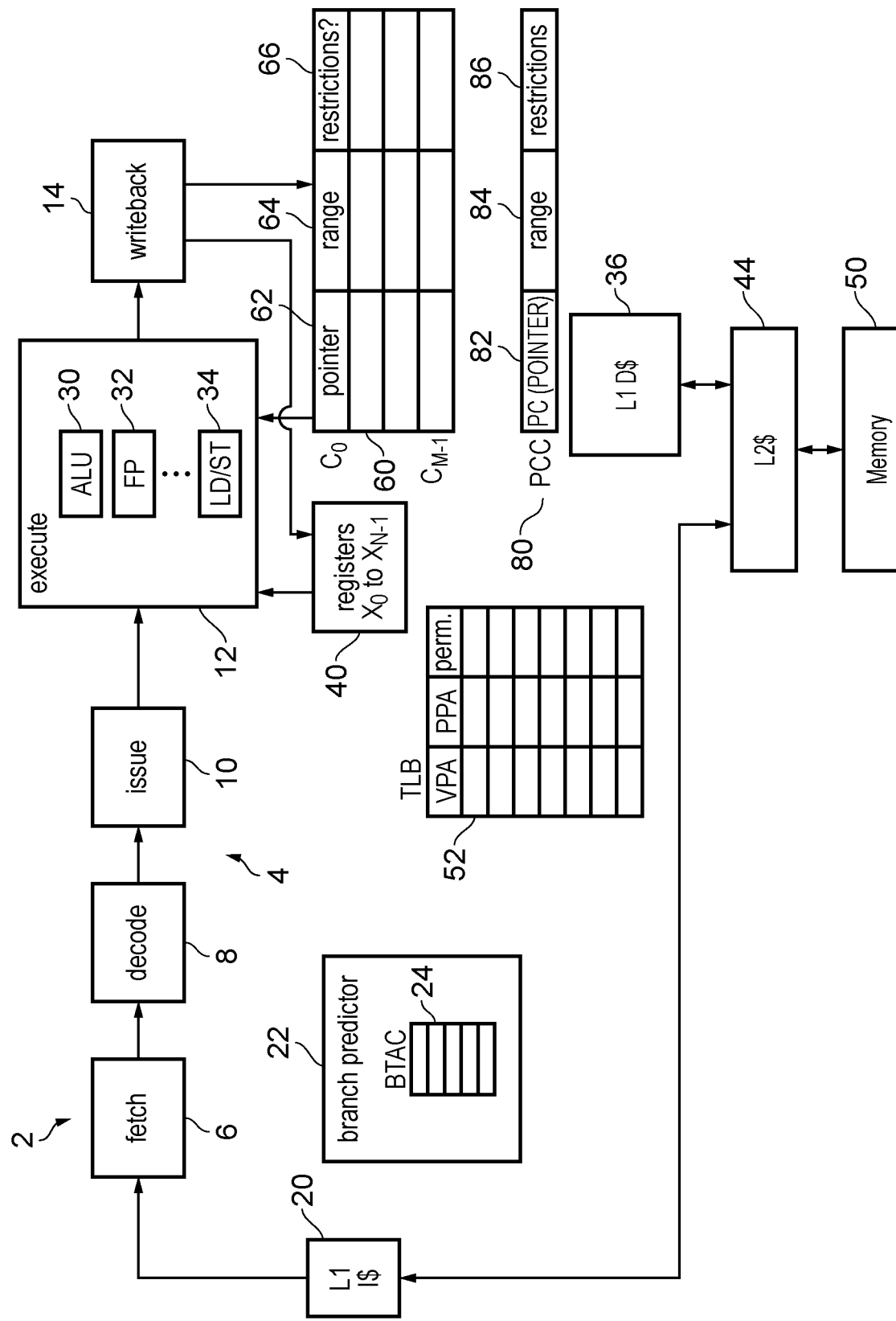
FIG. 1 is a block diagram of an apparatus in accordance with one embodiment.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
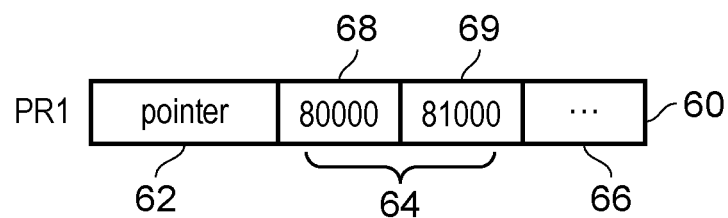
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Figure 3:
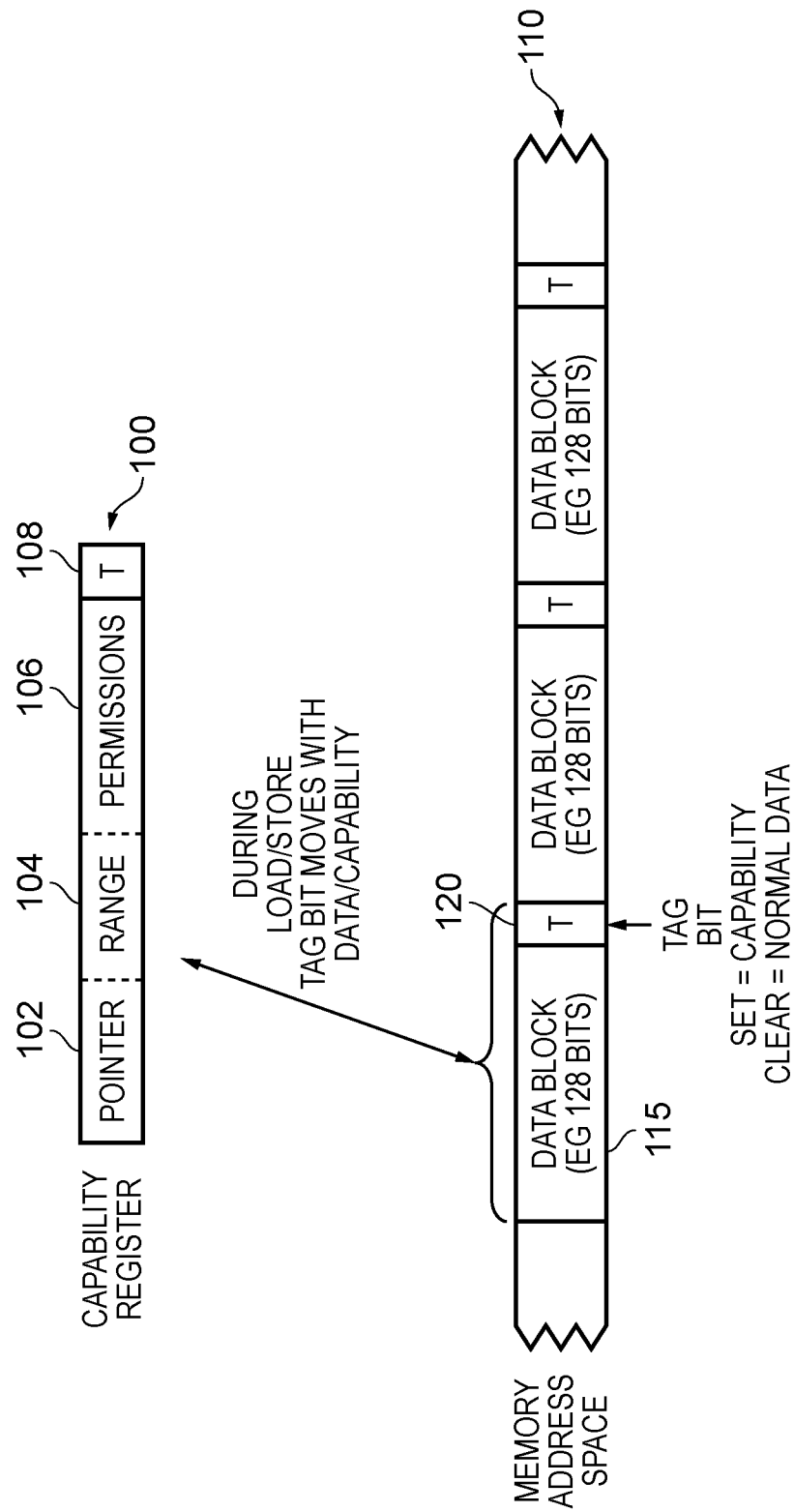
FIG. 3 illustrates the use of a tag bit in association with bounded pointers, in accordance with one embodiment.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

FIG. 4 is a diagram schematically illustrating a signing operation that may be used to convert an unsigned capability into a signed capability, and a corresponding authorisation operation that may subsequently be used to convert the signed capability back into an unsigned capability. An unsigned capability 150 (also referred to as an unsigned bounded pointer) is provided as an input operand for the signing operation, the capability 150 comprising a pointer portion 155 and an attributes portion 160. Within the pointer portion 155 a pointer value is specified, and within the attribute portion 160 range information is specified, along with various permissions information indicative of allowed uses of the pointer value provided within the unsigned capability. For example, the permissions information may identify for which type of operations the pointer is allowed to be referenced, and hence for example whether the pointer can be used to identify data to load or store, to identify instructions to be fetched, etc. In addition, as discussed earlier, a tag bit 165 is provided, which is set to identify that the associated block of information represents a capability. The size of the capabilities may be varied dependent on implementation, but consistent with the earlier-described example where a capability comprises 128 bits then in one embodiment the pointer portion 155 may comprise 64 bits, and the attributes portion 160 may also comprise 64 bits.

The cryptographic signing function 170 used to convert the unsigned capability into a signed capability receives a number of inputs that are used to derive the signature to be added to form the signed capability. In particular, the function 170 has access to a cryptographic signing key, and in addition has access to a salt value. The salt value can take a variety of forms, but in one embodiment represents contextual information that will only be available to a task or tasks that will legitimately need to unsign the signed capability, and hence which should be able to successfully perform an authorisation operation in respect of the signed capability. The contextual information can take a variety of forms, but in one embodiment may for example be a stack pointer location that will only be known to the task or tasks that will legitimately want to authorise the signed capability.

In addition, the function 170 receives at least a portion of the pointer value stored within the pointer portion 155. In one implementation, it is expected that the pointer value will comprise a certain number of unique pointer bits, with the remaining most significant bits being either a sign-extended version of the unique pointer bits (hence being all ones or all zeros depending on the most significant bit of the unique pointer bits), or a zero-extended version of the unique pointer bits (i.e. all zeros). In one embodiment, this essentially redundant information in a certain number of the most significant bits of the pointer value is used as a location in which to insert the signature once generated, thereby enabling the signature to be incorporated within the signed capability without any loss of information. In an alternative embodiment, the process may be arranged to insert the signature into another part of the capability, for example within a number of the bits of the attribute portion 160, as for example will be discussed later with reference to the embodiment of FIG. 15. In a yet further example embodiment, it may be the case that there are sufficient unused bits within the unsigned capability encoding that those unused bits can be used within the signed capability to hold the signature value.

In the embodiment shown in FIG. 4, it is assumed that the signature is inserted into the upper bits of the pointer portion 155, and in particular in the section that will contain either all ones or all zeros. In the embodiment shown in FIG. 4, it is the case that the entirety of the pointer value is still used as an input to the signing function 170, and a cryptographic signing function is performed using that pointer value, the cryptographic signing key and the salt value, in order to generate a signature, also referred to herein as a hash. Any suitable cryptographic signing function can be used for this purpose.

In an alternative embodiment, the process may be arranged so that only the unique pointer bits are used as an input to the cryptographic signing function 170 rather than the entire pointer value. Irrespective of which approach is taken, if the signature is to be added in the upper portion of the pointer value within the signed capability, the process of the described embodiment will perform a check to ensure that the pointer is "canonical" such that the signing field (i.e. the portion of the pointer value that is to be overwritten with the signature) contains a sign-extended or zero-extended version of the unique pointer bits. This will then ensure that a valid signing process to create a signed capability followed by a valid authorisation process to create an unsigned version of that signed capability will provide a resultant unsigned version that corresponds with the original unsigned capability 150. There are a number of ways in which this check can be performed. For example, in one embodiment a check is performed to ensure that this condition is true before signing, as will be discussed later with reference to the example of FIG. 6. Alternatively, a test authentication after signing process could be incorporated within the function 170 in order to compare the original capability against the authorised capability (i.e. the capability created after authenticating the signed capability).

As shown in FIG. 4, once the signature has been created, it is inserted in the section 179 of the portion 176 of the signed capability 175. The unique pointer bits are then retained within the section 177 of the portion 176. Within the permissions portion 180, a signing field 182 is provided, which is set to identify that the capability 175 is a signed capability, and in addition the tag bit 185 is retained in the set state to indicate that the associated 128 bits of data represent a capability. By providing a separate signing field 182, this enables certain requested operations to behave differently dependent on whether the input capability they are provided with is an unsigned capability or a signed capability. This for example enables the apparatus to prevent certain actions being performed in respect of signed capabilities, thereby providing further enhanced security.

As shown in the lower part of FIG. 4, an authorisation function 190 can be invoked in order to seek to unsign the signed capability 175. Firstly the unique pointer bits 177 are identified, and then subjected to a sign-extending operation 192 in order to generate the original pointer value that was used at the time the signing function 170 was performed. If the original pointer value was expressed in a zero-extended format, then at step 192 a zero-extending operation would instead be performed. Furthermore, if only the unique pointer bits had been used as an input to the signing function 170 then no sign-extension or zero-extension operation is required at step 192, and instead the unique pointer bits can be provided directly to the authorisation signature generation function 195.

As shown in FIG. 4, the authorisation signature generation function 195 also has access to the cryptographic signing key and to a salt value. It will be appreciated that unless the authorisation signature generation function 195 has access to the same salt value (i.e. the same item of contextual information) as was used by the cryptographic signing function 170, then it is highly unlikely that it will generate an authorisation signature that will match the signature inserted in the section 179 of the signed capability.

The authorisation signature generated by the authorisation signature generation function 195 using the relevant pointer bits, the cryptographic signing key and the salt value, is then input to a comparison block 198, where it is compared with the signature held in the section 179 of the signed capability. In the event of a match, then authorisation is said to have been passed, and an unsigned version of the signed capability 175 is generated. Otherwise, a fail condition is identified, causing predetermined actions to be taken, as will be discussed by way of example later with reference to FIG. 7.

Assuming the authorisation check is passed, then the unsigned capability is created by removing the signature from the section 179, and replacing it with a sign-extended (or zero-extended depending on implementation) version of the unique pointer bits in the section 177, in order to recreate the initial pointer value. Furthermore, the signing information 182 is cleared to identify that the capability is now unsigned.

The signing field 182 can take a variety of forms. FIG. 5 illustrates two example approaches. In accordance with one approach, a dedicated single-bit signing field is provided, where a first value indicates that the capability is unsigned and a second value indicates that the capability is signed. In the example shown in FIG. 5, it is assumed that when the value is set to a logic one value, this indicates that the capability is signed, whereas if it is cleared to a logic zero value this indicates that the capability is unsigned. It will be appreciated however that in different embodiments the meaning of a logic zero value and a logic one value within the signing field 182 can be reversed.

In an alternative embodiment, rather than providing a dedicated bit for the signing information, a multi-bit type field may be provided so that at least one other property of the bounded pointer may be identified in addition to whether it is signed or not. Some possible encodings are shown in FIG. 5. The other types of capability that it may be desired to represent will clearly vary dependent on embodiment. Purely by way of illustration, the multi-bit type field may be used to identify when a capability is a sealed capability. As discussed for example in Technical Report No. 850, entitled "Capability Hardware Enhanced RISC Instructions: CHERI Instruction-Set Architecture" by R Watson et al, University of Cambridge Computer Laboratory, UCAM-CL-TR-850, ISSN 1476-2986, a seal may be used as a lock on a capability in order to prevent it being used. Only the entity that has the right key (the one that locked it, and generally implemented as a capability itself) can unlock it.

By using a multi-bit type field, in situations where there are more than two different types of capability that may be represented, this can lead to a more efficient encoding within the available attributes space of the capability.

FIG. 6 is a flow diagram illustrating the signing operation in accordance with one embodiment. At step 200, the signing of a capability is requested, for example by the processor executing a signing instruction. Thereafter, at step 205 the bits of the pointer to be overwritten by the signature are identified. As per the example of FIG. 4, the identified bits would be the upper bits of the pointer value that are a sign-extended version of the unique pointer bits.

At step 210, it is then determined whether all of the identified bits have the same value as the most significant bit of the remaining portion of the pointer, i.e. whether they truly are a sign-extended version of the unique pointer bits. As mentioned earlier, in an alternative embodiment a zero-extended format may be used, and in that case at step 210 it will be determined whether all of the identified bits are zero.

If it is determined at step 210 that all of the identified bits do not meet the required condition, i.e. in the example of FIG. 6 are bits that do not have the same value as the most significant bit of the remaining portion of the pointer, then the process proceeds to step 235 where a predetermined action is taken. The predetermined action can take a variety of forms, but in one embodiment may involve raising a processor fault, in order to cause an exception to be taken to handle further processing. Alternatively, the identified input capability may be invalidated, for example by clearing the tag bit so that effectively the capability is converted into general purpose data, and can no longer be used as a capability. By performing the step 210 and proceeding to the step 235 when the condition is not met, this protects against the possibility that the acts of signing an unsigned capability, and subsequently authorising the signed capability, could give rise to a resultant unsigned capability that does not match the original unsigned capability, i.e. in the example of FIG. 4 due to the process of signing and unsigning potentially creating a different pointer value.

Whilst it is important that the act of signing and subsequently authorising does not change the pointer value, it is also important that the act of signing and authorisation cannot change the rights associated with the capability, for example change the range specified by the range information, or change the permissions specified for the capability. In one particular embodiment, due to encoding space limitations within the capability, it may be arranged that the range information is specified relative to the pointer value, and as a result, when the pointer value is legitimately changed a process needs to be performed to re-encode the range information appropriately. Within such an environment, it is clearly even more important to ensure that the acts of signing and authorisation cannot cause the pointer value to change, since if they could this may cause the range information to also be changed, and hence change the rights associated with the capability.

Assuming the check at step 210 is passed, and hence it is determined that all of the identified bits have the same value as the most significant bit of the remaining portion of the pointer value, then the process proceeds to step 215, where a signature is created from the pointer value, the signing key and the salt value. Thereafter, at step 220, the identified bits of the pointer are replaced with the signature, as discussed earlier with reference to FIG. 4, and at step 225 the signing attribute field 182 is set to indicate that the capability has been signed. Thereafter, at step 230, the signed capability can be output, for example for storing in one of the capability registers 60.

FIG. 7 is a flow diagram illustrating the authorisation process performed in accordance with one embodiment. At step 250, authorisation of a signed capability is requested, for example by the processor executing an authorisation instruction. At step 255, the unique pointer bits size is then identified. This is important to ensure that the correct bits are used for performing the authorisation process. In one embodiment, the size of the unique pointer bits portion may be fixed, and hence will not change. In an alternative embodiment, the size of the unique pointer bits portion within the pointer value may be globally configured under software control, for example by software executing at a predetermined privileged level. In a yet further example, the size of the unique pointer bits portion may be context sensitive, and again may be set under software control, with the value being dependent on the current context. Authorisation will typically be performed in the same context as was used for the associated signing operation. If necessary, a check could be performed to confirm that this condition is met, in order to allow authorisation to proceed.

Following step 255, the unique pointer bits are extracted at step 260, whereafter they are sign-extended at step 265 in order to form the full pointer value. As mentioned earlier, if a zero-extended format were used in the unsigned pointer, then the extracted bits would be zero-extended at step 265.

At step 270, the authorisation signature generation function 195 is performed in order to create an authorisation signature from the pointer value, the signing key and the salt value. Thereafter, at step 275 it is determined whether the authorisation signature matches the signature provided within the signed capability, and if not the process proceeds to step 295 where a predetermined action is taken. The predetermined action can take a variety of forms. For example, a processor fault may be raised in order to take an exception, or the signed capability may be invalidated, for example by clearing the tag bit. In a yet further example arrangement, it may be decided to leave the capability as signed, and hence not complete the authorisation process. It will then be expected that any subsequent use of the capability will fail since that subsequent use will be expecting to use an unsigned capability, and the capability will at that point still be signed.

If at step 275 it is determined that the authorisation signature matches the signature in the signed capability, then the authorisation process is deemed to have been passed, and the process proceeds to step 280 where the signature in the capability is replaced with the sign-extended bits derived from the reduced size pointer at step 265. In addition, at step 285 the signing attribute information is cleared to indicate that the capability is unsigned, and thereafter at step 290 the unsigned capability is output, for example for storage within one of the capability registers 60.

As mentioned earlier, whilst in one embodiment the range information may be specified in absolute terms, and hence any change to the pointer value does not itself change the range, in an alternative embodiment, for example where encoding space is constrained within the capability, the range information may be specified relative to the pointer in order to reduce the amount of information to be stored within the capability to specify the range. Such an arrangement is shown for example in FIG. 8. In particular, two offsets 305, 310 may be specified to form the range information, these identifying the offset from the pointer to the base and the offset from the pointer to the limit, hence enabling an identification of the two ends of the range 315. Limit determination processes 307, 312 can then be performed using the pointer value 300 and the relevant offset information in order to identify the extent of the range 315. Whilst this can provide a reduction in the number of bits required to specify the range information, it does give rise to a need to adjust the range information when the pointer value is changed, in order to ensure that the range is not altered as a result of an adjustment to the pointer.

By providing the signing information within the field 182 of the signed capability, it is possible to readily identify whether an input capability is signed or not signed, and to cause the processor to operate differently dependent on whether the capability is signed or not signed. This enables, for example, certain restrictions to be placed on the ways in which a signed capability is used, where such restrictions may not be in place in situations where the capability is unsigned. FIG. 9 illustrates one example option where immutability of the signed capability is enforced. Accordingly, at step 350, it is assumed that a modification to request some aspect of a specified input capability is requested. This may for example take the form of an instruction specifying an input capability, for example with reference to one of the capability registers 60, and being a type of instruction that causes part of the capability to be modified. At step 355, the identified input capability is retrieved, and the signing attribute information is reviewed to see if it indicates whether the capability is signed or unsigned. If the capability is unsigned, then the process proceeds to step 360 where the normal capability modification processing is performed, as per the request received at step 350. However, if it is determined that the specified input capability is signed, then instead the process proceeds to step 365 where a predetermined action is taken. This may for example cause a processor fault to be raised, or for the input capability to be invalidated. As a further option, it may be decided to leave the capability signed but unmodified. However, in some instances this may be considered not to be a suitable option, as it may be desired to have some direct indication that the modification behaviour was errant.

By making signed capabilities immutable, this gives rise to two strong properties. Firstly, it is not possible for a rogue entity to seek to change the signed capability into a different form that will be easier to authorise, since no changes can be made to the capability whilst it is signed. Further, in situations where the bounds information may be specified relative to the pointer value, there is no need to consider the potential implications of making alterations to a signed capability, since any attempt to modify the signed capability will give rise to a fault, or invalidation of the capability.

As an alternative to making the entire signed capability immutable, it may instead be arranged that certain fields within the signed capability are immutable, and accordingly the check 355 may be performed dependent on the type of modification being requested at step 350, and in particular the field of the signed capability that is to be modified.

FIG. 10 illustrates an alternative option to FIG. 9, where changes to the signed capability, and in particular to the pointer value, are allowed. Hence, at step 370 a change to the pointer value is requested. At step 372 it is determined from the signing attribute of the specified input capability whether that capability is signed. If it is not, then the process proceeds to step 374 where the pointer value is interpreted as being of the full size, i.e. the full 64 bits in accordance with the example of FIG. 4, and at step 376 the full size pointer value is adjusted in accordance with the request received at step 370. In this example, it is assumed that the bounds information is specified relative to the pointer value, as per the arrangement discussed earlier with reference to FIG. 8, and accordingly in addition to adjusting the pointer value itself, at step 378 a bounds adjustment operation is performed to adjust the bounds information (i.e. the range attributes) to take account of the change in the full size pointer.

However, if at step 372 it is determined from the signing attribute that the input capability is signed, then a different interpretation of the pointer value is taken. In particular, at step 380 the pointer value is interpreted as having a reduced size, i.e. the full size minus the size of the signature that has been inserted. By interpreting the pointer value differently in the signed capability than it is interpreted in the unsigned capability, this avoids the need to change the bounds information when signing a capability and when later unsigning a capability. In contrast, if the pointer value had still been considered to be of the full size, then the bits of the signature inserted in the most significant bits of the pointer field would have effectively altered the pointer value, and it would be necessary to seek to adjust the bounds information accordingly both when the signature is inserted (hence causing a first change to the pointer value), and during an authorisation process when the signature is subsequently removed (hence causing another change to the pointer value). These complications are avoided by using the different interpretation of the pointer value when the capability is signed, and the use of these two different interpretations is readily implementable due to the use of the signing attribute information 182 within the capabilities to identify whether they are signed or unsigned, hence enabling the processor to readily distinguish between a signed capability and an unsigned capability.

Returning to FIG. 10, then at step 382 it is determined whether the requested change to the reduced size pointer value will retain the pointer within the reduced size available, i.e. there is no overflow condition. If this is not the case, then the process proceeds to step 388, where a predetermined action is taken, such as the earlier mentioned raising of a processor fault, or invalidating of the capability. However, assuming the requested change can be accommodated within the reduced size pointer, then at step 384 the reduced size pointer is adjusted, and then at step 386 the bounds information is adjusted to take account of the change in the reduced size pointer.

By readily enabling the processor to distinguish between signed capabilities and unsigned capabilities through the use of the signed information in the associated attributes, this enables the processor to adjust other types of operation dependent on whether the specified input capability is signed or unsigned. For example, in one embodiment as shown in FIG. 11, the dereferencing of a signed capability is prohibited, thus ensuring that a signed capability cannot be used to identify a memory address to be accessed. In particular, at step 400, a request is received to dereference a capability. This for example may arise by virtue of executing a load instruction or a store instruction identifying a specified input capability to derive the memory address to be accessed. At step 405, it is determined from the signing attribute information whether the specified capability is signed or unsigned. If it is not signed, then the process merely proceeds to step 410, where the pointer value within the capability is used in the standard manner to access memory, assuming that the memory address derived from the pointer is within the bounds specified by the capability, and that the type of access being requested is allowed by the permissions attributes of the capability.

However, if at step 405 it is determined that the input capability is signed, then at step 415 a predetermined action is taken, for example raising a processor fault or invalidating the capability.

As an alternative option to step 415, it may be deemed appropriate to allow the memory address to be derived from the entire pointer value field, which due to the incorporation of the signature within the most significant bits may be arranged to ensure that the pointer will identify a faulting address in memory, hence causing the memory access to fail. However, in other implementations it may be determined that such an approach does not give the desired level of security, since it is reliant on the use of a pointer value in which the signature specifying the most significant bits of the pointer value will identify a faulting address.

FIG. 12 is a flow diagram illustrating another type of operation where the processing performed may be dependent on whether the specified input capability is signed or unsigned. In particular, in accordance with the embodiment of FIG. 12 a capability signing process is invoked, for example by a signing instruction being executed identifying an input capability. At step 425, it is determined whether the input capability is already signed, by referring to the signing attribute information. If it is not, then the normal capability signing process may be performed at step 430, for example using the earlier described approach of FIG. 6. However, if it is determined at step 425 that the capability is already signed, then instead a predetermined action can be taken at step 435, for example by triggering a fault condition, or invalidating the capability. Another alternative option may be to retain the capability as a signed capability with the original signing information.

As a result, through use of the signing information within the associated attributes of a capability, it is possible to distinguish between signed and unsigned capabilities when performing the signing operation, and hence, if desired, prevent signed capabilities from being resigned. In an alternative embodiment, it may be decided to allow signed capabilities to be resigned, and accordingly the process of FIG. 12 would not be used.

Whilst in one embodiment the only way to unsign a signed capability may be to use an authorisation process such as that discussed earlier with reference to FIG. 7, where a signature match checking process is required before allowing the capability to be unsigned, in another embodiment an additional function may be provided for allowing signed capabilities to be unsigned in certain situations. In particular, a strip function may be provided that permits, under certain conditions, a signed capability to be converted into an unsigned capability without performing the signature match check. Such a process is illustrated by way of example in FIG. 13.

In particular, at step 450, a stripping of a signed capability is requested, for example by executing a strip instruction specifying an input capability. At step 455, it is determined whether stripping is permitted, this step being discussed in more detail later with reference to the examples of FIGS. 14A to 14C. If stripping is not permitted, then a predetermined action is taken at step 490, for example by raising a processor fault, invalidating the capability, or leaving the capability as signed.

If stripping is permitted, then at step 460 the unique pointer bits size is identified, whereafter the unique pointer bits are extracted at step 465, and then sign-extended at step 470 to form the full pointer value. Steps 460, 465, 470 are essentially the same as steps 255, 260, 265 discussed earlier with reference to FIG. 7 when describing the authorisation process.

Steps 475, 480 and 485 then correspond to steps 280, 285 and 290 of FIG. 7, causing the signature in the capability to be replaced with the sign-extended bits, the signing attribute information to be cleared, and the resultant unsigned capability to be output. As can be seen form a comparison of FIG. 13 with FIG. 7, then providing stripping is permitted, there is no need to create any authorisation signature or check whether the authorisation matches the signature in the signed capability.

As such, it will be appreciated that the strip functionality is a potentially powerful tool, and accordingly in one embodiment it is considered appropriate to restrict use of the strip functionality to certain predetermined situations. Some example restrictions that may be placed on use on the stripping functionality are set out in FIGS. 14A to 14C. Considering first FIG. 14A, then it is assumed at step 500 that stripping of a signed capability is requested. In such a situation, it is determined at step 505 whether the processor is operating in a predetermined elevated privileged state. The predetermined elevated privileged state may take a variety of forms depending on embodiment, but considering for example a virtual machine type environment, the predetermined elevated privileged state may be the hypervisor level. If the processor is determined not to be operating in the predetermined elevated privileged state, then the process proceeds to step 515, where a fault occurs, i.e. one of the predetermined actions identified in step 490 of FIG. 13 is performed. However, if the processor is in the predetermined elevated privileged state, then the stripping function is performed at step 510, by following the "yes" path from step 455 of FIG. 13.

FIG. 14B illustrates an alternative approach, where steps 520, 530 and 535 correspond to steps 500, 510 and 515 of FIG. 14A, but where the test 505 is replaced by the test 525, and in particular it is determined whether a privileged configuration register has been set to allow stripping. The privileged configuration register may for example be a register that is settable by the processor when operating in a predetermined privileged state, and accordingly its value can only be modified by the processor operating in that predetermined privileged state. Assuming the contents of the configuration register indicate that stripping is allowed, then the stripping function is performed at step 530, but otherwise a fault is raised at step 535.

FIG. 14C illustrates another alternative approach where a strip capability is defined. As mentioned earlier, capabilities effectively identify a set of rights that are available to the processor, and whilst most capabilities may take the form of the earlier-described bounded pointers, not all capabilities need to be a bounded pointer. Instead, a capability may be defined that merely identifies certain rights in relation to particular functionality. Hence, a strip capability may be defined, which could for example be held within one of the capability registers 60, and specified as an input for a stripping operation. Hence, a strip instruction could for example identify as one of its operands the strip capability, and as another operand the capability it is requesting to strip. In such an arrangement, following step 540 where it is determined that stripping of a signed capability has been requested, the strip capability identified by the strip instruction is retrieved from the relevant capability register at step 545 and then analysed to determine its contents. Then, at step 550 it is determined whether the strip capability allows the identified signed pointer to be stripped. If it does, then the stripping function is performed at step 555, whereas otherwise a fault is raised at step 560.

Whilst in one embodiment the strip capability may be a capability dedicated solely to identifying whether stripping is permitted, in an alternative embodiment a single capability held within the capability register 60 may identify a number of permissions, one of which is a stripping permission.

Within an apparatus such as discussed earlier, the instruction set that is executable by the processor may include a number of capability instructions, i.e. instructions that specifically identify as one or more operands capabilities. For example, to support the earlier described signing, authorisation and stripping functions, the following three instructions may be provided:

CSIGN—Convert capability to signed capability (capability register(s) as source and destination, and optional contextual information, e.g. salt value)

CAUTH—Convert signed capability to unsigned capability subject to successful authorisation (capability register(s) as source and destination, and optional contextual information, e.g. salt value)

CSTRIP—Convert signed capability to unsigned capability without authorisation process (capability register(s) as source and destination)

In each of these examples, the source and destination capability registers may be two different capability registers, or alternatively the same register may be specified as the source and destination, hence causing an unsigned capability to be overwritten with a signed capability, or vice versa.

In addition to providing dedicated instructions for signing, authorisation and stripping functions, in addition, if desired, such functionality can be combined with other functions. For example, in one embodiment the following two instructions may be provided to combine an authorisation process with a load operation and with a branch operation, respectively:

$CLDR_A$—Convert signed capability (from capability register) into unsigned capability subject to successful authorisation (may leave signed capability unchanged in capability register), and use pointer to identify memory address from which to load an item (capability or data) into a register $CBR_A$—Convert signed capability (from capability register) into unsigned capability subject to successful authorisation (may leave signed capability unchanged in capability register), and use pointer to determine an update to the program counter value Accordingly, by such functions, it is possible to retain a capability as signed but to unsign it as part of another operation, hence allowing the unsigned variant to then be used when performing the remainder of the operation, whilst retaining the original signed capability within the capability register. This can provide certain performance improvements within code that operates using signed capabilities.

In the earlier example, it was assumed that the signature was added in to a certain number of the most significant bits of the pointer value. However, in an alternative embodiment, the signature may instead be added into a portion of the attributes field, for example within the bounds information. This illustrated by way of example in FIG. 15. In the example of FIG. 15 the unsigned capability includes a pointer portion 600, and an attributes portion including the bounds section 605 and the permissions section 610. A tag bit 615 is also provided, which is set to identify that the associated contents represent a capability rather than general purpose data. When the capability is signed, then in this example the pointer value remains unchanged, and instead the signature is inserted within a part of the available space for the bounds information, as shown by the hash field 625. This results in a reduced size bounds field 620, as will be discussed in more detail later with reference to FIG. 16A. As per the earlier example, a signing attribute field 632 is also provided and is set to indicate that the capability has been signed, resulting in a modified permissions section 630. The tag bit 615 is retained set to identify that the associated information is still a capability.

One potential benefit from such an approach is that the pointer is not changed by the signing process, and hence there is no potential effect on the bounds information in situations where the bounds information is specified relative to the pointer. In addition, such an approach can be used even if there are not a sufficient number of most significant bits of the pointer value that contain sign-extended or zero-extended bits, i.e. effectively redundant information. However, in accordance with such an approach there needs to be sufficient redundant information in the bounds information to accommodate the insertion of the signature.

FIG. 16A is a flow diagram illustrating the signing process in situations where the signature is added to the bounds information. At step 650, signing of a capability is requested, for example by execution of a signing instruction, whereafter at step 655 it is determined if there is sufficient redundancy in the bounds information bits to accommodate the signature. For example, it may be the case that the bounds information comprises a specification of a base value and a limit value, and both of those values have a certain amount of redundant information in their upper bits. If those upper bits are sufficient to incorporate the signature without any loss of information, then it will be determined that there is sufficient redundancy in the bounds information to accommodate the signature. In some instances, even if this is not the case, it may be possible to reduce the precision in the bounds information in order to create sufficient redundancy, and hence replace the original bounds information with a reduced precision set of bounds information, and hence free up sufficient space for the signature.

If at step 655 it is determined that there is insufficient redundancy in the bounds information to accommodate the signature, then the process proceeds to step 680 where a predetermined action is taken, for example raising a processor fault or invalidating the input capability.

However, assuming sufficient redundancy exists, then at step 660 the signature is created from the pointer value, the signing key and the salt value, whereafter at step 665 the identified redundant bits in the bounds information are replaced with the signature. In addition, at step 670 the signing attribute information is set to indicate that the capability has been signed, and then at step 675 the signed capability is output, for example for storage in one of the capability registers 60.

FIG. 16B is a flow diagram illustrating a corresponding authorisation process that is performed if the signature is added to the bounds information. At step 700, a request to authorise a signed capability is received, whereafter at step 705 an authorisation signature is created from the pointer, the signing key and the salt value. By comparison of FIG. 16B with FIG. 7, it will be appreciated that there is no need to identify the unique pointer bits, as the entirety of the pointer can be used, and was unaffected by the signing operation.

At step 710, it is determined whether the authorisation signature matches the signature in the signed capability, and if not a predetermined action is taken at step 730, these corresponding to the predetermined actions discussed earlier with reference to step 295 of FIG. 7.

Assuming the authorisation signature matches the signature in the signed capability, then at step 715 the signature is replaced with the redundant bounds information. This may for example in one embodiment involve storing all zero values in those bits that were previously used for the signature.

In addition, at step 720 the signing attribute information is cleared to identify that the capability is now unsigned, and then the unsigned capability is output at step 725.

As discussed earlier, for example with reference to FIG. 3, when capabilities are moved between memory and the capability registers, the tag bit moves with the capability to identify that the associated block of data stored in memory is in fact a capability. However, in some implementations, it may be necessary to store capabilities from memory into a backing store such as a disk, due for example to there being insufficient space to retain all of the capability information within the memory, or when supporting hibernation. In one embodiment, this involves decomposing each capability into separate data and tag portions, and treating the tag as data within the backing store. This is illustrated schematically in FIG. 17, where, as per the approach described earlier with reference to FIG. 3, when capabilities are moved between the capability registers 800 and memory 805, then the tag bit 815 moves with each data block 810. Hence, each block of data in memory 805 can be identified as representing either a capability or general purpose data. When a data block is moved to the backing store 825, then a decomposition process 820 is used to decompose the capability into data 824 and tag information 822, the tag information being treated as data. Accordingly, within the backing store the information merely persists as data, and the backing store is capability unaware.

When reconstructing capabilities from data stored in the backing store, the reconstruction process needs to constrained, as the security that is available through the use of capabilities could be compromised if it were possible to merely construct capabilities from general data in the backing store. In particular, when an operation requests that a capability is created, and identifies data within the backing store to form that capability, it is desirable for a process to be put in place to check that the data being identified, if converted into a capability, would form a capability that the processor is entitled to have.

In one embodiment, this is achieved by performing a reconstruction operation 830 to reconstruct a capability with reference to a master capability, also referred to herein as a general capability. In particular, in one embodiment, the general capability provides information sufficient to enable any allowed capability to be derived from the general capability. Hence, considering capabilities in the form of bounded pointers, the general capability 835 is specified so that the reconstruction operation 830 will only be able to generate an allowable bounded pointer from that general capability.

The process used to reconstruct capabilities may take a variety of forms, but in one embodiment the processor is arranged to perform a refinement process on the general capability with reference to the specified data retrieved from the backing store 825. Hence, a capability reconstruction operation may be invoked, identifying a block of data and an associated item of tag data within the backing store 825 (which may in one embodiment at that point be moved from the backing store into one or more registers to allow the data to then be manipulated by the processor), and using that information the operation 830 can seek to refine the master capability so that the resultant capability matches that identified data. If this is possible, then this indicates that the identified data can indeed represent a capability, and accordingly the process 830 can set the tag bit in association with that data and output it as a capability for storing in memory 805. The data used at this point to generate the capability from may in one embodiment be the refined version of the master capability, or alternatively may be the data retrieved from the backing store. In either event, at this stage the relevant data will typically be held in register, and so a store operation can for example be used to store the capability from a register into the memory 805.

However, if the refinement process performed with respect of the master capability cannot be made to result in a capability matching the specified data, then this indicates that the data from the backing store cannot be used to identify a capability, and a fault is raised.

Whilst the master capability 835 can be used to effectively represent a super-set of all of the available permissions and ranges that could be associated with a valid capability, when the issue of signed capabilities is considered, it will be appreciated that it is not possible to derive a signature from a refinement of a master capability. In one embodiment, this issue is addressed by allowing, under certain controlled conditions, the use of data from the backing store to form a signature within a reconstructed capability, hence allowing the reconstruction process 830 to also recreate signed capabilities. This process is discussed in more detail with reference to the flow diagram of FIG. 18.

In particular, as shown at step 850, when the reconstruction process is invoked, the data identified for that reconstruction process is retrieved from the backing store. In one embodiment the data retrieved is stored in one or more working registers. For example, the data block portion (i.e. the 128 bits of data in the earlier discussed embodiment) that may potentially represent a capability may be stored in one of the capability registers 800, but with the tag bit cleared to indicate that it is not (currently) representative of a valid capability. In addition the bit of data retrieved from the backing store that is indicative of the tag bit can be stored in a general purpose register. Thereafter, at step 855 it is determined whether the data bit that forms the tag information (i.e. the bit now stored in the general purpose register) indicates that the data is to form a capability. If not, the process merely proceeds to step 857 where the retrieved data may be output from the capability register to the memory 805 with the tag bit cleared to identify that the data block is general purpose data.

However, if the data bit that forms the tag information indicates that the data retrieved is to form a capability, then at step 860 a refinement process is invoked to seek to refine a copy of the master capability using the retrieved data to narrow the permissions and bounds of the master capability, and also to set the pointer value. It will be appreciated that this refinement process can be implemented in a variety of ways, but in one embodiment could be an iterative process (for example by executing a sequence of refinement instructions).

At step 865, it is determined whether the original data retrieved from the backing store indicates that the capability is to be signed. For example, the relevant field in the data that would represent the signing information within the associated attributes of a capability may be reviewed in order to see if it is set or cleared, and hence whether the data, were it converted into a capability, would represent a signed capability or an unsigned capability. If, as a result of step 865, it is determined that the capability to be created is unsigned, the process proceeds to step 867, where it is determined whether the required capability could be successfully created by refinement of the master capability 835. In one embodiment, this condition will be considered to be passed if a refinement process performed with respect of the master capability results in a sequence of bits having the same value as the bits retrieved from the backing store, hence indicating that the data retrieved from the backing store can represent a valid capability. In that event, the process proceeds to step 895 where the capability is created by setting the tag bit in association with the refined version of the master capability (which will typically at this point reside within a register), and then the capability is output to memory 805 (maintaining the tag bit set to identify that the data block is in fact a capability), for example by performing a suitable store operation. In an alternative embodiment the capability may be generated at this point from the copy of the data retrieved from the backing store, with the tag bit being set prior to output to the memory 805.

The above step 895 could be implemented in a variety of ways. For example, a "SetTag" instruction could be executed to identify the source (capability) register in which the data being used to form the capability is temporarily stored, and a destination capability register into which the generated capability is to be stored and for which the tag bit is to be set to identify it as a capability. In one embodiment the source and destination registers could be the same register. In one variant of the "SetTag" instruction, there could effectively be two source registers, namely the register containing the refined version of the master capability resulting from step 860, and the register containing the raw data retrieved from the backing store, since both of these registers may be referred to when generating the resultant capability (as for example will be discussed below with reference to steps 885, 890).

A separate store instruction could then be executed to store the capability from the register to memory.

If it is determined at step 867 that the capability cannot successfully be created by refinement of the master capability, then instead the process proceeds to step 870 where a fault occurs. For example, a processor fault could be raised in order to cause an exception to be taken. As another option, the data could be retained in the capability register 800 to which it was temporarily retrieved, but with the tag bit maintained in the cleared state to identify the data as general purpose data rather than a capability. Another alternative would be to set an efficiently testable processor condition, e.g. by setting a condition flag, or by placing a value in a general purpose register that can be checked with a test and branch instruction.

If at step 865 it is determined that the original data indicates that the capability is to be signed, then as mentioned earlier, it will not be possible to generate the signature by refinement of the master capability. Accordingly, if a signed capability is to be reconstructed, it will be necessary to allow at least the data representing the signature to be copied directly into the capability.

Accordingly, instead of step 867, the process proceeds to step 869, where it is determined whether all parts of the capability other than those relating to the signed nature of the capability, in particular the signature and the signing attribute information, can successfully be created by refinement of the master capability. If not, then a fault is raised at step 870. However, otherwise the process proceeds to step 875, where it is determined whether signing is permitted during reconstruction. As will be discussed later with reference to FIGS. 19A to 19C, there are a number of possible checks that could be performed at this stage, but it is envisaged that generally some constraint will be placed on situations where it is allowed to sign a capability directly using the data retrieved from the backing store. If it is determined at step 875 that signing is not permitted during reconstruction, then a fault is raised at step 880. The options available at step 880 may for example correspond to the options available at step 870. Alternatively, the capability may be generated as an unsigned capability if step 880 is reached, instead of generating a fault.

If it is determined that signing is permitted during reconstruction, then the signature is identified to correspond to a sequence of the bits retrieved from the backing store and is inserted at step 885 in an identified portion of the data that is to form the generated capability, for example in a certain number of most significant bits of the pointer value if the approach of the earlier-discussed FIG. 4 is used.

In addition, if signing attribute information is to be provided within the attributes portion of the generated capability, then (as indicated by step 890) that signing attribute information is set within a further identified portion of the data that is to form the generated capability, and will indicate that the capability is a signed capability when that capability is generated. Thereafter, the process proceeds to step 895, where the capability is generated and output to memory, with the tag bit being set to identify the associated data block as being a capability.

If the capability is generated at step 895 from the refined version of the master capability, then at steps 885 and 890 the register temporarily holding that refined version will be updated with the relevant parts of the raw data retrieved from the backing store. If instead the capability is generated from the copy of the data retrieved from the backing store, then it is steps 885 and 890 that effectively allow those relevant parts of the raw data to deviate from the refined version of the master capability and hence implement the insertion and setting functions defined by steps 885 and 890.

It should be noted that whilst in the earlier described embodiments a signed capability includes a signing attribute field to identify the associated capability as either being signed or unsigned, the general reconstruction process discussed with reference to FIGS. 17 and 18 can be implemented irrespective of whether such additional signing information is provided within the attributes field. Hence, even where such a signing attribute field is not used, the described process can still be used to generate a signed capability by insertion of the relevant signature using the data retrieved from the backing store when reconstructing a capability from data held in the backing store.

FIGS. 19A to 19C illustrate various checks that could be performed to determine whether signing is permitted during reconstruction at step 875 of FIG. 18. As will be apparent from a comparison of FIGS. 19A to 19C with FIGS. 14A to 14C, these checks are in one embodiment analogous to the checks that could be performed to decide whether to allow a signed capability to be stripped. Accordingly, considering FIG. 19A, when signing during reconstruction is requested at step 900, it may be determined at step 905 whether the processor is currently operating in a predetermined elevated privileged state, and if so to allow the signature to be inserted at step 910, whereas otherwise a fault is raised at step 915 (step 915 corresponding to step 880 of FIG. 18).

In accordance with the alternative approach to FIG. 19B, then steps 920, 930 and 935 correspond to steps 900, 910 and 915 of FIG. 19A, but the decision 905 is replaced by the decision 925, where it is checked whether a privileged configuration register has been set to allow a signature be inserted. That privileged configuration register will typically only be writeable to by the processor when the processor is operating in at least one predetermined privileged state.

In accordance with the alternative example of FIG. 19C, then a signing capability is provided which may for example be stored within one of the capability registers 60. This signing capability provides information identifying whether signing is permitted during reconstruction of a capability from data held in the backing store. Hence, when signing during reconstruction is requested at step 950, in accordance with this embodiment a related signing capability will be identified, and that signing capability will be retrieved at step 955 in order to allow its contents to be analysed. For example, an insert signature instruction may be used to initiate the insertion of a signature during reconstruction of a capability from general purpose data, and the signing capability may be identified as an operand of that insert signature instruction. Once the relevant signing capability has been retrieved, it is then determined at step 960 whether the signing capability allows a signature to be inserted, and if so then the process proceeds to step 965 where the signature is inserted using the data held in the backing store. Otherwise, a fault is raised at step 970.

Whilst the options of FIGS. 19A to 19C may be considered alternatives, in some embodiments they may be used in combination so that if any one test is met, then insertion of a signature is deemed to be allowed.

The process of FIG. 18 can be implemented in a variety of ways. For example, it could be implemented in hardware, where the hardware responds to a single instruction initiating the reconstruction process to perform all of the steps identified in FIG. 18. Alternatively, the process could be implemented in software by using a sequence of instructions to implement the reconstruction process of FIG. 18. In accordance with the latter approach, a series of instructions may for example be executed to examine the relevant data fields of the retrieved raw data from the backing store one by one, to refine the master capability in order to set bounds, permissions, etc, and to write the refined master capability to memory.

The reconstruction process of FIGS. 17 to 19 can be used in a variety of situations. For example, it may be that a task A such as a paging system task may have sufficient capability (by virtue of its access to the general capability 835) to set up capabilities for a further task (task B), prior to passing over control to task B. The paging system task can, through the adoption of the process of FIGS. 17 to 19, create the required capabilities, and store them in shared memory, whereafter those capabilities can then be allocated to task B. It will be appreciated that this is just one example scenario of how the capability reconstruction process may be used, and it will be appreciated that there are also other scenarios where the ability to reconstruct capabilities from data in the backing store will be useful.

Through use of the above described techniques, it will be appreciated that the strong security afforded by the use of capabilities can be further enhanced through the use of a signing operation to generate signed capabilities. For example, by combining the signing functionality with capabilities, then the inherent security afforded by capabilities is further enhanced in order to further reduce the prospect of a rogue entity seeking to circumvent control flow integrity.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
processing circuitry responsive to a bounded pointer generation request to perform a generation operation to generate a bounded pointer from specified data provided at least one generation condition is met, the bounded pointer comprising a pointer value and associated attributes, the associated attributes including range information indicative of an allowable range of addresses when using said pointer value;
the processing circuitry, responsive to detection from the specified data that the bounded pointer to be generated is a signed bounded pointer incorporating a signature and at least when a signing condition is met, to perform as part of the generation operation an insert signature operation during which the signature is determined from a portion of the specified data and incorporated within the bounded pointer; and
storage to store the bounded pointer generated by the processing circuitry; wherein
the processing circuitry is arranged to incorporate the signature within the bounded pointer within a plurality of specified bits, where a value of the plurality of specified bits within an unsigned version of the bounded pointer is reproducible from other bits of the bounded pointer.

2. An apparatus as claimed in claim 1, wherein the processing circuitry is further arranged, on performing the insert signature operation, to set signing information within the associated attributes of the bounded pointer to identify that the bounded pointer has been signed.

3. An apparatus as claimed in claim 1, wherein:
the processing circuitry is arranged to perform the insert signature operation as part of the generation operation only if said signing condition is met;
the processing circuitry being arranged, in response to determining that said signing condition is not met, to prevent generation of the signed bounded pointer.

4. An apparatus as claimed in claim 3, wherein said signing condition is met when the processing circuitry is operating in at least one predetermined privileged state.

5. An apparatus as claimed in claim 3, further comprising:
a configuration storage element writeable to by the processing circuitry when operating in at least one predetermined privileged state;
wherein said signing condition is met when the configuration storage element identifies that performance of the insert signature operation is permitted.

6. An apparatus as claimed in claim 3, further comprising:
a capability storage element for storing a signing capability;
wherein the processing circuitry is arranged to obtain the signing capability from the capability storage element as an operand for the insert signature operation; and
wherein said signing condition is met when the signing capability identifies that performance of the insert signature operation is permitted.

7. An apparatus as claimed in claim 1, wherein:
the processing circuitry is arranged to have access to a general capability during performance of the generation operation, the general capability providing information sufficient to enable an allowed bounded pointer to be derived from the general capability;

wherein the allowed bounded pointer is one whose pointer value and associated attributes are consistent with rights identified by the information provided by the general capability;

the processing circuitry being arranged to perform a refinement process on the general capability with reference to the specified data; and the at least one generation condition is met when the refinement process results in generation of an allowed bounded pointer that is consistent with the specified data.

8. An apparatus as claimed in claim 7, wherein during the refinement process the processing circuitry seeks to narrow the range information and one or more permissions identified within the general capability, so as to match the values of corresponding portions of the specified data.

9. An apparatus as claimed in claim 8, wherein during the refinement process the processing circuitry further seeks to set the pointer value to a value allowed by the general capability and that matches the value of a corresponding portion of the specified data.

10. An apparatus as claimed in claim 7, wherein when the specified data indicates that the bounded pointer to be generated is to be a signed bounded pointer, the at least one generation condition is met when the refinement process results in an allowed bounded pointer that matches those portions of the specified data other than any portion containing signing specific information.

11. An apparatus as claimed in claim 10, wherein the portion of the specified data containing signing specific information is that portion from which the signature is determined.

12. An apparatus as claimed in claim 11, wherein the portion of the specified data containing signing specific information further includes a data field providing signing information to be inserted within the associated attributes of the generated bounded pointer to identify that the bounded pointer has been signed.

13. An apparatus as claimed in claim 1, wherein:
said plurality of specified bits are used to contain a portion of the pointer value within the unsigned version of the bounded pointer; and
said portion of the pointer value is derivable from a remaining portion of the pointer value.

14. An apparatus as claimed in claim 1, wherein:
said plurality of specified bits are used to contain a portion of the range information within the unsigned version of the bounded pointer; and
a range specified by the range information is representable within a remaining portion of the range information.

15. A method of generating signed bounded pointers, comprising:
performing, in response to a bounded pointer generation request, a generation operation to generate a bounded pointer from specified data provided at least one generation condition is met, the bounded pointer comprising a pointer value and associated attributes, the associated attributes including range information indicative of an allowable range of addresses when using said pointer value;

performing as part of the generation operation, in response to detection from the specified data that the bounded pointer to be generated is a signed bounded pointer incorporating a signature, and at least when a signing condition is met, an insert signature operation during which the signature is determined from a portion of the specified data and incorporated within the bounded pointer; and outputting for storing in a storage location the bounded pointer;

wherein the signature is incorporated within the bounded pointer within a plurality of specified bits, where a value of the plurality of specified bits within an unsigned version of the bounded pointer is reproducible from other bits of the bounded pointer.

16. An apparatus, comprising:
processing means for performing a generation operation, in response to a bounded pointer generation request, to generate a bounded pointer from specified data provided at least one generation condition is met, the bounded pointer comprising a pointer value and associated attributes, the associated attributes including range information indicative of an allowable range of addresses when using said pointer value;

the processing means further for performing as part of the generation operation, in response to detection from the specified data that the bounded pointer to be generated is a signed bounded pointer incorporating a signature, and at least when a signing condition is met, an insert signature operation during which the signature is determined from a portion of the specified data and incorporated within the bounded pointer; and storage means for storing the bounded pointer generated by the processing means; wherein
the processing means is arranged to incorporate the signature within the bounded pointer within a plurality of specified bits, where a value of the plurality of specified bits within an unsigned version of the bounded pointer is reproducible from other bits of the bounded pointer.

* * * * *